US012563618B2

(12) United States Patent
Jung et al.

(10) Patent No.: US 12,563,618 B2
(45) Date of Patent: Feb. 24, 2026

(54) ELECTRONIC DEVICE FOR SWITCHING CONNECTION OF DEVICE TO DEVICE COMMUNICATION

(71) Applicant: Samsung Electronics Co., Ltd., Suwon-si (KR)

(72) Inventors: Buseop Jung, Suwon-si (KR); Beomjip Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 18/306,611

(22) Filed: Apr. 25, 2023

(65) Prior Publication Data

US 2023/0389097 A1 Nov. 30, 2023

Related U.S. Application Data

(63) Continuation of application No. PCT/KR2023/002735, filed on Feb. 27, 2023.

(30) Foreign Application Priority Data

May 30, 2022 (KR) ......................... 10-2022-0066340
Aug. 8, 2022 (KR) ......................... 10-2022-0098706

(51) Int. Cl.
*H04W 76/14* (2018.01)
*H04W 76/12* (2018.01)

(52) U.S. Cl.
CPC ........... *H04W 76/14* (2018.02); *H04W 76/12* (2018.02)

(58) Field of Classification Search
CPC ....... H04W 76/14; H04W 4/70; H04W 8/005; H04W 88/06; H04L 61/5007
See application file for complete search history.

(56) References Cited

U.S. PATENT DOCUMENTS 8,274,903 B2 9/2012 Wentink et al.
8,965,283 B2 2/2015 Wentink et al.
(Continued)

FOREIGN PATENT DOCUMENTS

EP 3 018 967 B1 3/2018
KR 10-2012-0059547 A 6/2012
(Continued)

OTHER PUBLICATIONS

Patil, Abhishek et al., TDLS Handling in MLO, IEEE 802.11-20/1692r2, See slides 1-25, Dec. 3, 2020.
(Continued)

*Primary Examiner* — Gary Mui
*Assistant Examiner* — Yewon Kim
(74) *Attorney, Agent, or Firm* — Jefferson IP Law, LLP

(57) ABSTRACT

An electronic device is provided. The device includes a communication circuit and a processor configured to receive, in a connected state with an access point (AP), information on an external electronic device related to a first communication scheme and information on the external electronic device related to a second communication scheme different from the first communication scheme, set up a first session supported by the first communication scheme with the external electronic device, based on the information on the external electronic device related to the first communication scheme, discover the external electronic device, based on the information on the external electronic device related to the second communication scheme according to the electronic device satisfying a predetermined condition, set up a second session, based on data related to the second communication scheme, and transmit and/or receive the data through the second session.

20 Claims, 11 Drawing Sheets

(56) References Cited

U.S. PATENT DOCUMENTS

| | | | |
|---|---|---|---|
| 9,148,902 | B2 | 9/2015 | Grandhi et al. |
| 9,356,974 | B2 | 5/2016 | Nagawade et al. |
| 9,749,832 | B2 | 8/2017 | Rajamani et al. |
| 9,998,901 | B2 | 6/2018 | Qi et al. |
| 2011/0034127 | A1 | 2/2011 | Wentink et al. |
| 2011/0103264 | A1* | 5/2011 | Wentink ................ H04W 8/005 |
| | | | 370/255 |
| 2011/0122835 | A1* | 5/2011 | Naito ................... H04W 76/14 |
| | | | 370/329 |
| 2012/0250576 | A1* | 10/2012 | Rajamani ............. H04W 8/005 |
| | | | 370/254 |
| 2013/0176903 | A1 | 7/2013 | Bijwe |
| 2013/0227152 | A1 | 8/2013 | Lee et al. |
| 2016/0345155 | A1* | 11/2016 | Lee ......................... H04W 4/80 |
| 2017/0171895 | A1* | 6/2017 | Kandagadla .......... H04W 24/08 |
| 2019/0261440 | A1 | 8/2019 | Lim et al. |

FOREIGN PATENT DOCUMENTS

| | | | |
|---|---|---|---|
| KR | 10-2016-0105031 | A | 9/2016 |
| KR | 10-2018-0016883 | A | 2/2018 |
| WO | 2012/060611 | A2 | 5/2012 |
| WO | 2017/105689 | A1 | 6/2017 |
| WO | 2019/162812 | A1 | 8/2019 |
| WO | 2011/035100 | A2 | 3/2021 |

OTHER PUBLICATIONS

Ibrahim, Ahmed et al., Resolution for Miscellaneous CIDs related to TDLS (CC36), IEEE 802.11-22-600r03, See pp. 1-4, May 11, 2022.

International Search Report dated May 24, 2023, issued in International application No. PCT/KR2023/002735.

European Search Report dated Apr. 14, 2025, issued in European Application No. 23816193.9.

\* cited by examiner

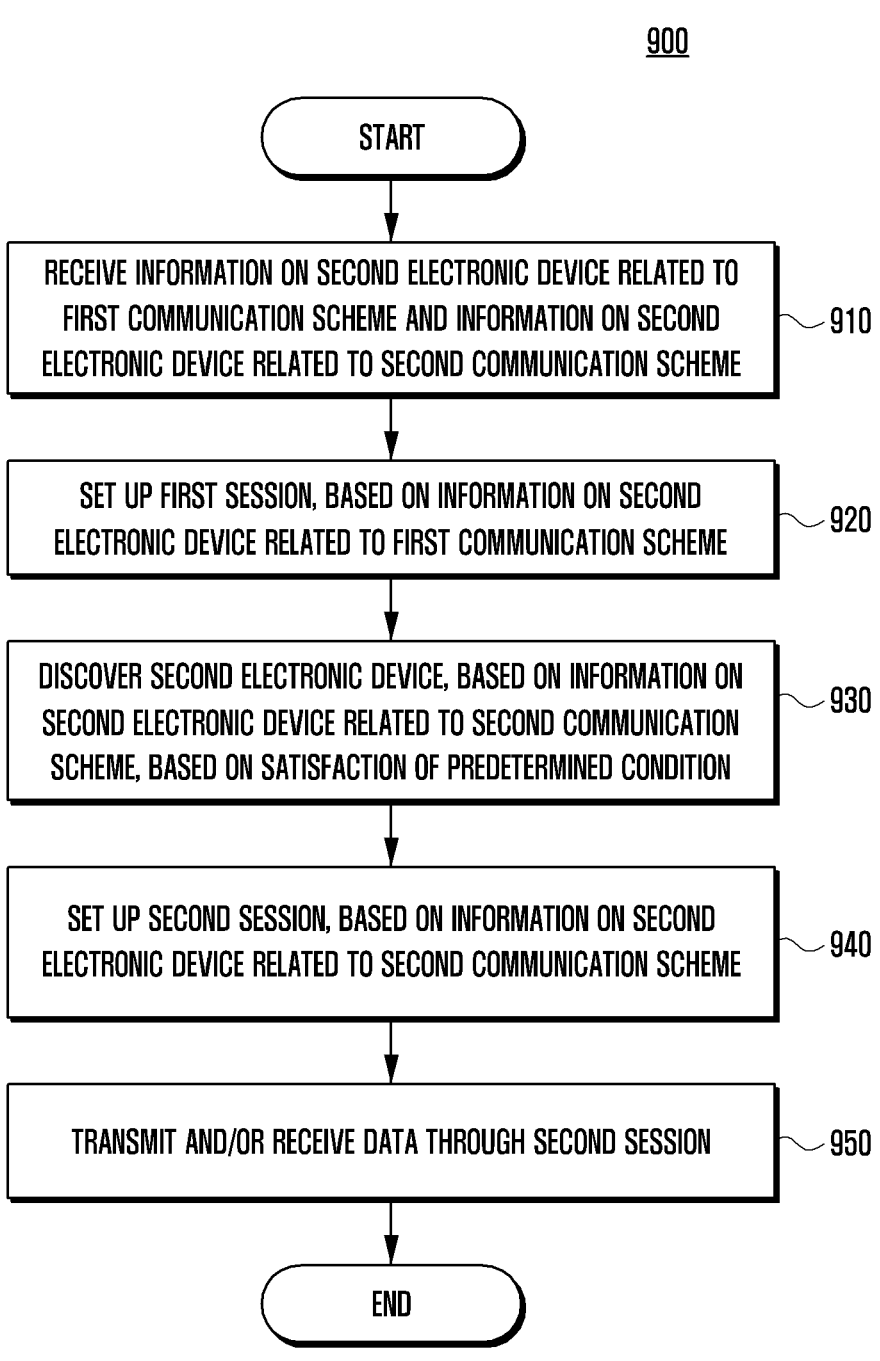

900

START

RECEIVE INFORMATION ON SECOND ELECTRONIC DEVICE RELATED TO FIRST COMMUNICATION SCHEME AND INFORMATION ON SECOND ELECTRONIC DEVICE RELATED TO SECOND COMMUNICATION SCHEME — 910

SET UP FIRST SESSION, BASED ON INFORMATION ON SECOND ELECTRONIC DEVICE RELATED TO FIRST COMMUNICATION SCHEME — 920

DISCOVER SECOND ELECTRONIC DEVICE, BASED ON INFORMATION ON SECOND ELECTRONIC DEVICE RELATED TO SECOND COMMUNICATION SCHEME, BASED ON SATISFACTION OF PREDETERMINED CONDITION — 930

SET UP SECOND SESSION, BASED ON INFORMATION ON SECOND ELECTRONIC DEVICE RELATED TO SECOND COMMUNICATION SCHEME — 940

TRANSMIT AND/OR RECEIVE DATA THROUGH SECOND SESSION — 950

END

ELECTRONIC DEVICE FOR SWITCHING CONNECTION OF DEVICE TO DEVICE COMMUNICATION

CROSS-REFERENCE TO RELATED APPLICATION(S)

This application is a continuation application, claiming priority under § 365(c), of an International application No. PCT/KR2023/002735, filed on Feb. 27, 2023, which is based on and claims the benefit of a Korean patent application number 10-2022-0066340, filed on May 30, 2022, in the Korean Intellectual Property Office, and of a Korean patent application number 10-2022-0098706, filed on Aug. 8, 2022, in the Korean Intellectual Property Office, the disclosure of each of which is incorporated by reference herein in its entirety.

TECHNICAL FIELD

The disclosure relates to an electronic device and a method of operating an electronic device. More particularly, the disclosure relates to an electronic device for switching device-to-device (D2D) communication supported in short-range wireless communication.

BACKGROUND ART

With the supply of various electronic devices, a speed of wireless communication which can be used by the various electronic devices has been improved. Among wireless communication recently supported by electronic devices, institute of electrical and electronics engineers (IEEE) 802.11 wireless local area network (WLAN) (or Wi-Fi) is the standard for implementing high-speed wireless connections of various electronic devices. Initially implemented Wi-Fi may support a maximum of transmission speed of 1 to 9 Mbps, but Wi-Fi 6 technology (or IEEE 802.11 ax) may support a maximum of transmission speed of about 10 Gbps.

The electronic device may support various services (for example, an ultra-high-definition (UHD) video streaming service, an augmented reality (AR) service, a virtual reality (VR) service, or a mixed reality (MR) service) using relatively large data through wireless communication supporting a high transmission speed and also support various other services.

In the IEEE 802.11z WLAN standard, a technology for supporting data transmission and reception through a tunneled direct link setup (TDLS) scheme is defined. The TDLS technology may be a technology for supporting data transmission and/or reception of an electronic device without passing through an access point (AP).

One or more electronic devices may be connected to each other through the TDLS technology, and a plurality of electronic devices may transmit and/or receive data through a direct connection between devices (i.e., device to device (D2D)) without passing through the AP.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

An electronic device may exchange data for generating a session with an external electronic device through a link provided by an AP in order to generate the session with the external electronic device through a tunneled direct link setup (TDLS) scheme. The data for generating the session may include information on the external electronic device related to the TDLS scheme.

The electronic device may receive data from the external electronic device or transmit data to the external electronic device in the session generated through the TDLS scheme. However, when the session generated through the TDLS scheme is ended by various causes, the electronic device may transmit or receive data to or from the external electronic device through the AP.

When data is transmitted or received through the AP, a transmission speed and/or a reception speed may be lower than data transmission or reception through the session generated between the electronic device and the external electronic device. The low transmission speed and/or reception speed may cause reduction in the quality of service (QoS) performed through the sessions and also the service may be stopped.

Aspects of the disclosure are to address at least the above-mentioned problems and/or disadvantages and to provide at least the advantages described below. Accordingly, an aspect of the disclosure is to provide an electronic device for switching device-to-device (D2D) communication supported in short-range wireless communication.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a communication circuit, and a processor operatively connected to the communication circuit, wherein the processor is configured to receive, in a connected state with an access point (AP), information on an external electronic device related to a first communication scheme for data transmission and/or reception between the external electronic device connected to the AP and the electronic device and information on the external electronic device related to a second communication scheme different from the first communication scheme, set up a first session supported by the first communication scheme with the external electronic device, based on the information on the external electronic device related to the first communication scheme, discover the external electronic device, based on the information on the external electronic device related to the second communication scheme according to the electronic device satisfying a predetermined condition while data transmission and/or reception through the first session are performed, set up a second session, based on data related to the second communication scheme, and perform data transmission and/or reception through the second session.

In accordance with another aspect of the disclosure, a method of operating an electronic device is provided. The method includes an operation of receiving, in a connected state with an access point (AP), information on an external electronic device related to a first communication scheme for data transmission and/or reception between the external electronic device connected to the AP and the electronic device and information on the external electronic device related to a second communication scheme different from the first communication scheme, an operation of setting up a first session supported by the first communication scheme with the external electronic device, based on the information on the external electronic device related to the first communication scheme, an operation of discovering the external electronic device, based on the information on the external electronic device related to the second communication scheme according to the first session satisfying a predetermined condition while data transmission and/or reception through the first session are performed, an operation of setting up a second session, based on information related to the second communication scheme, and an operation of performing data transmission and/or reception through the second session.

In accordance with another aspect of the disclosure, an electronic device is provided. The electronic device includes a communication circuit, and a processor operatively connected to the communication circuit, wherein the processor is configured to receive, in a connected state with an access point (AP) information on an external electronic device related to a first communication scheme for data transmission and/or reception between the external electronic device and the electronic device and information on the external electronic device related to a second communication scheme different from the first communication scheme, based on required transmission of data to the external electronic device connected to the AP, set up a first session supported by the first communication scheme and a second session supported by the second communication scheme with the external electronic device, based on the information on the external electronic device related to the first communication scheme and the information on the external electronic device related to the second communication scheme, transmit metadata corresponding to the data to the external electronic device through the first session, and transmit the data through the second session, based on reception of a signal making a request for transmitting the data from the external electronic device.

Advantageous Effects of Invention

An electronic device and a method of operating an electronic device according to various embodiments of the disclosure may receive information on an external electronic device related to a first communication scheme and information on the external electronic device related to a second communication scheme during a process of generating a session through the first communication scheme. The electronic device may rapidly generate a session through the second communication scheme on the basis of the information on the external electronic device related to the second communication scheme. Accordingly, in the state in which the session through the first communication scheme ends, the electronic device may perform data communication with the external electronic device by using the session through the second communication scheme, thereby preventing deterioration of the quality of service according to the end of the session through the first communication scheme.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent

Figure 2:
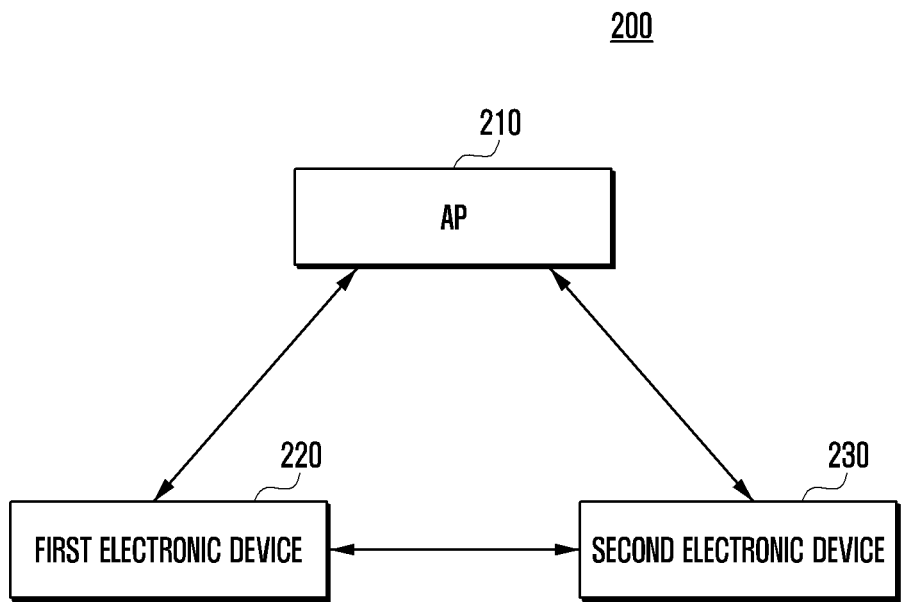
Figure 3A:
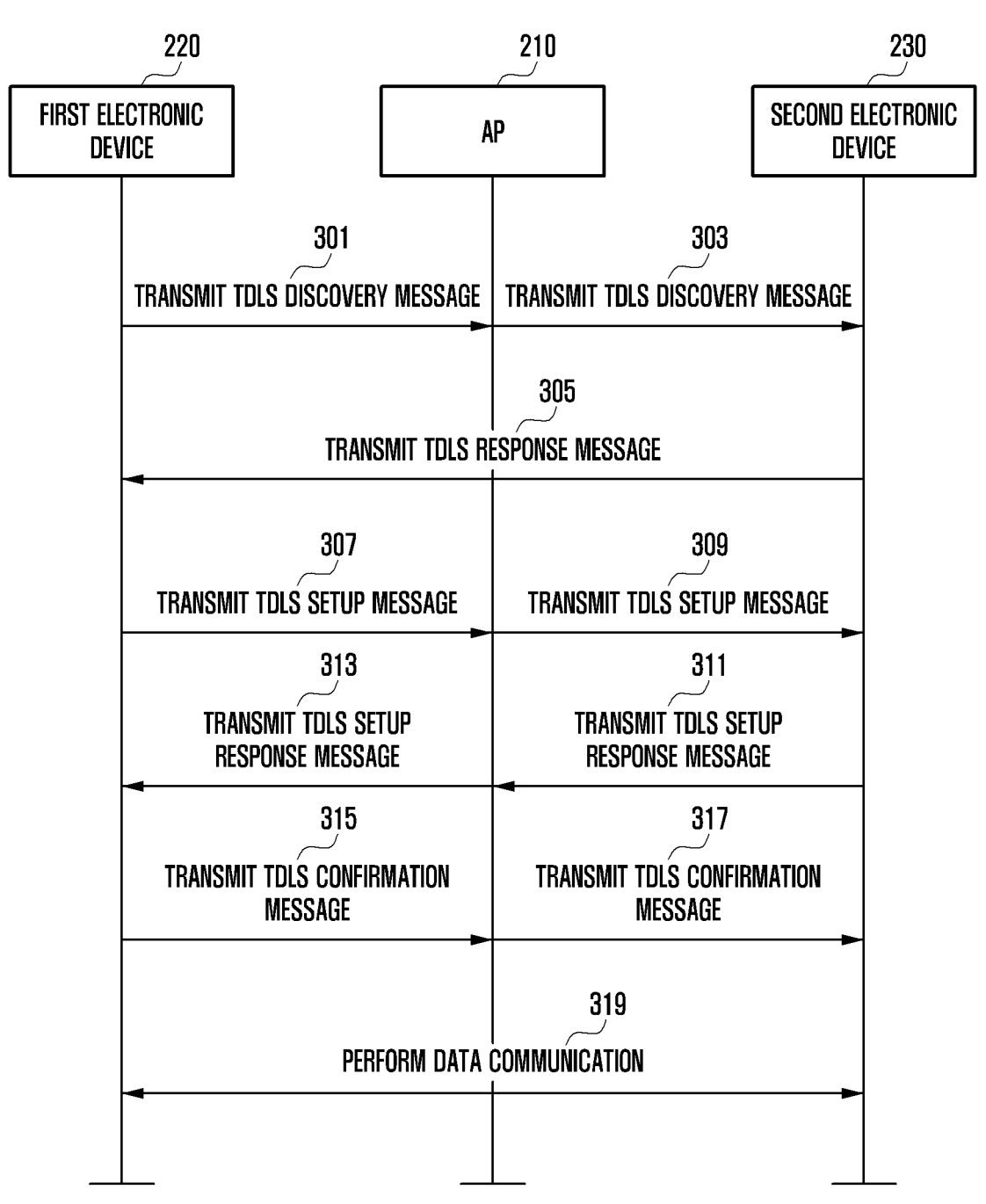
Figure 3B:
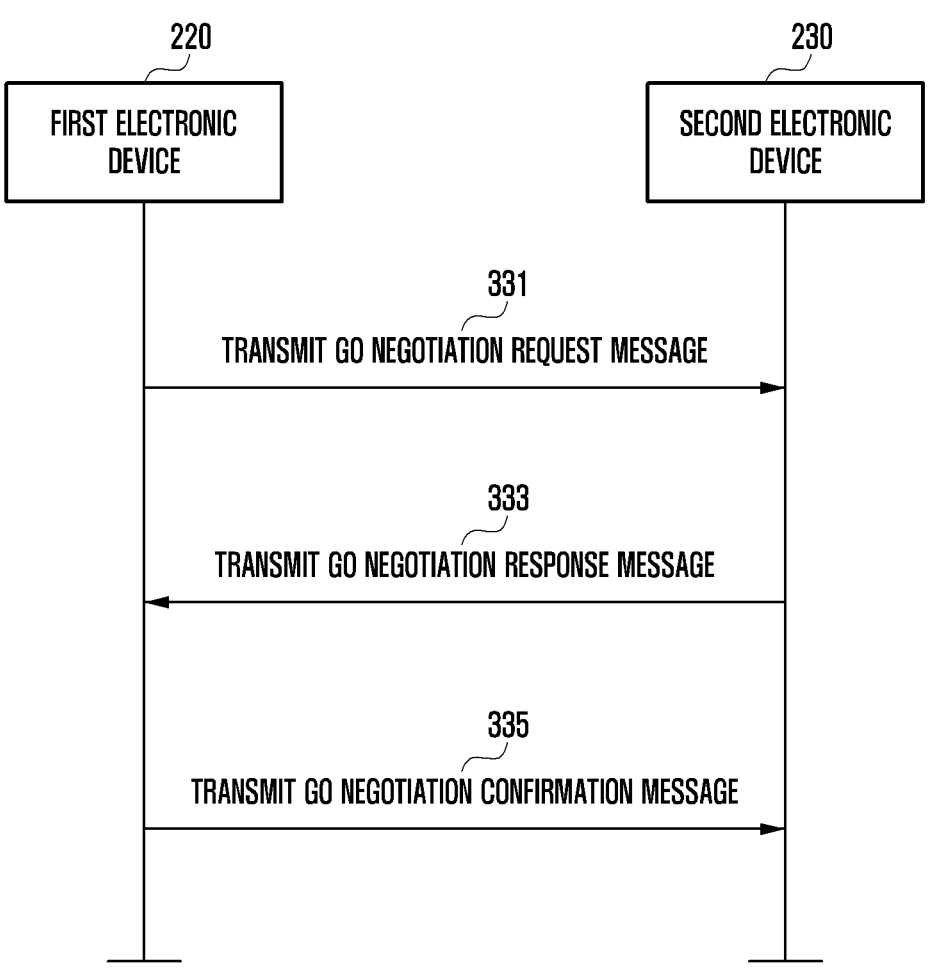
Figure 3C:
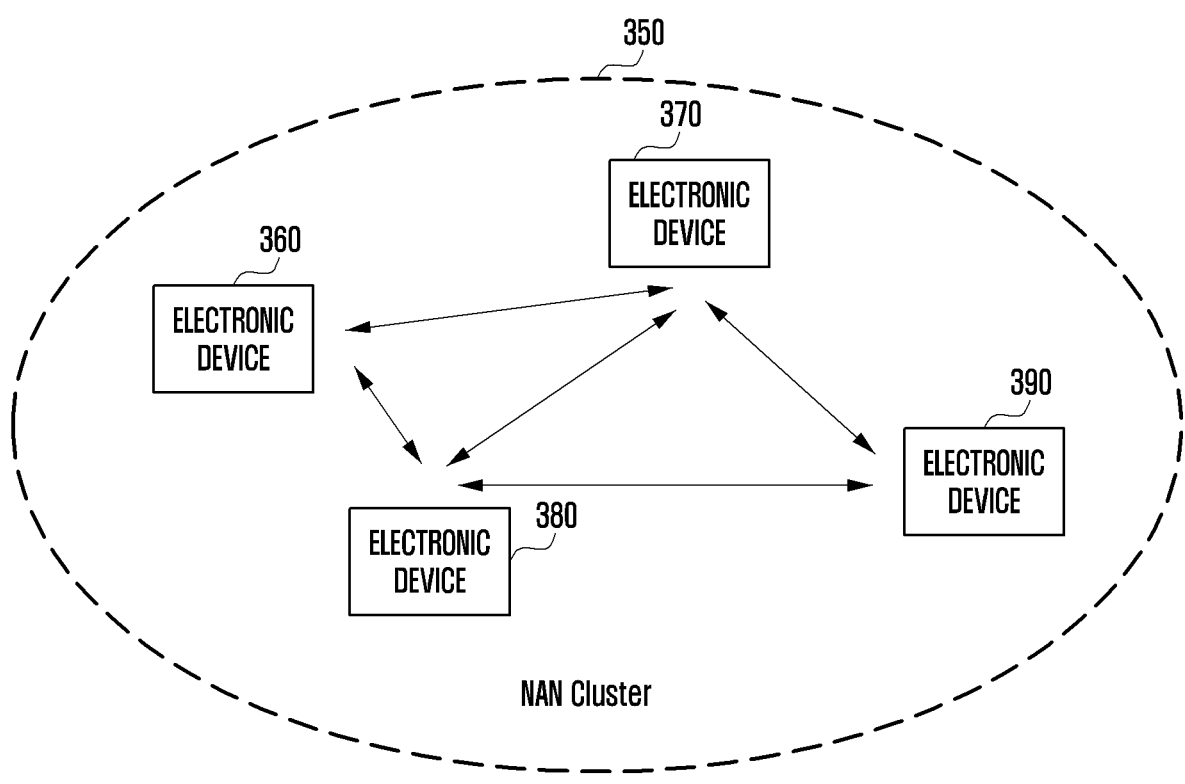
Figure 4:
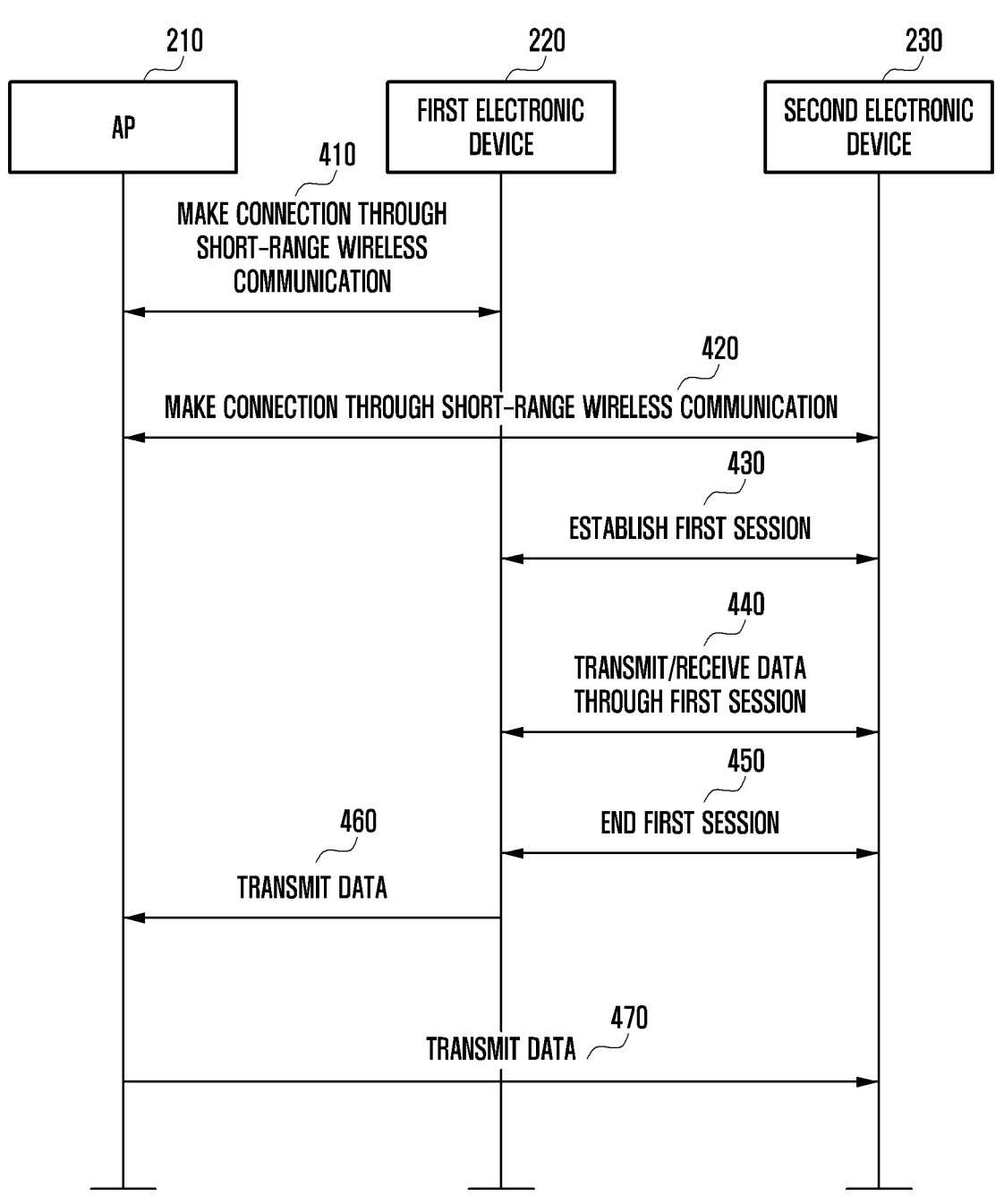
Figure 5:
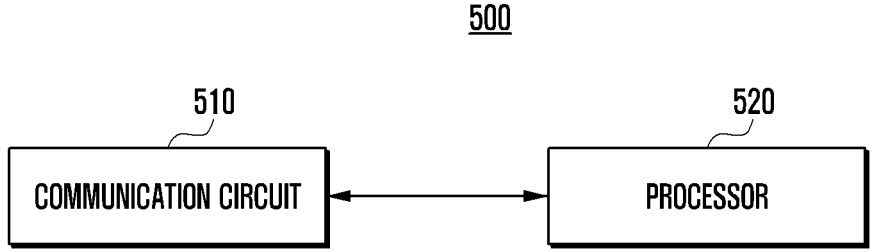
Figure 6:
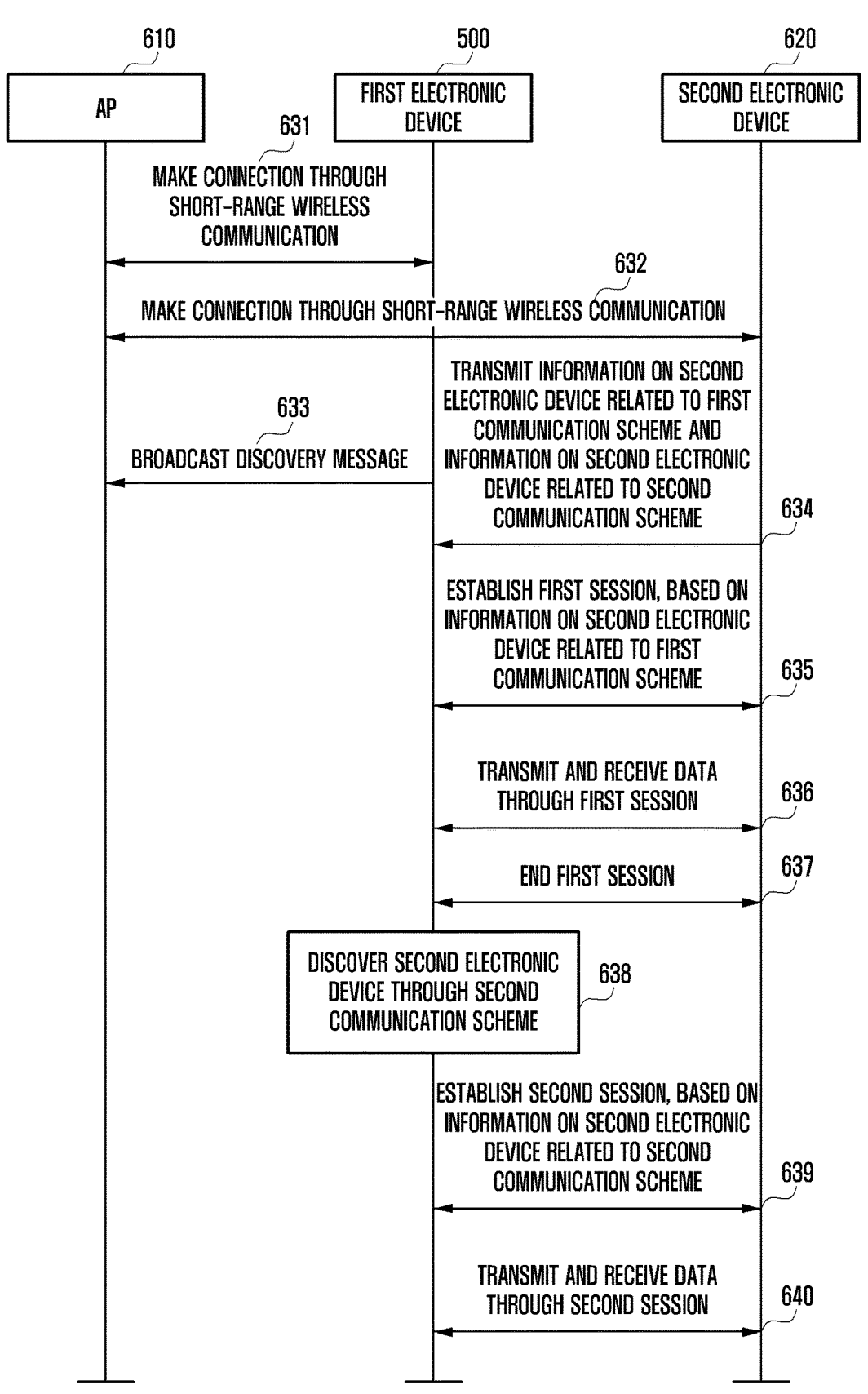
Figure 7:
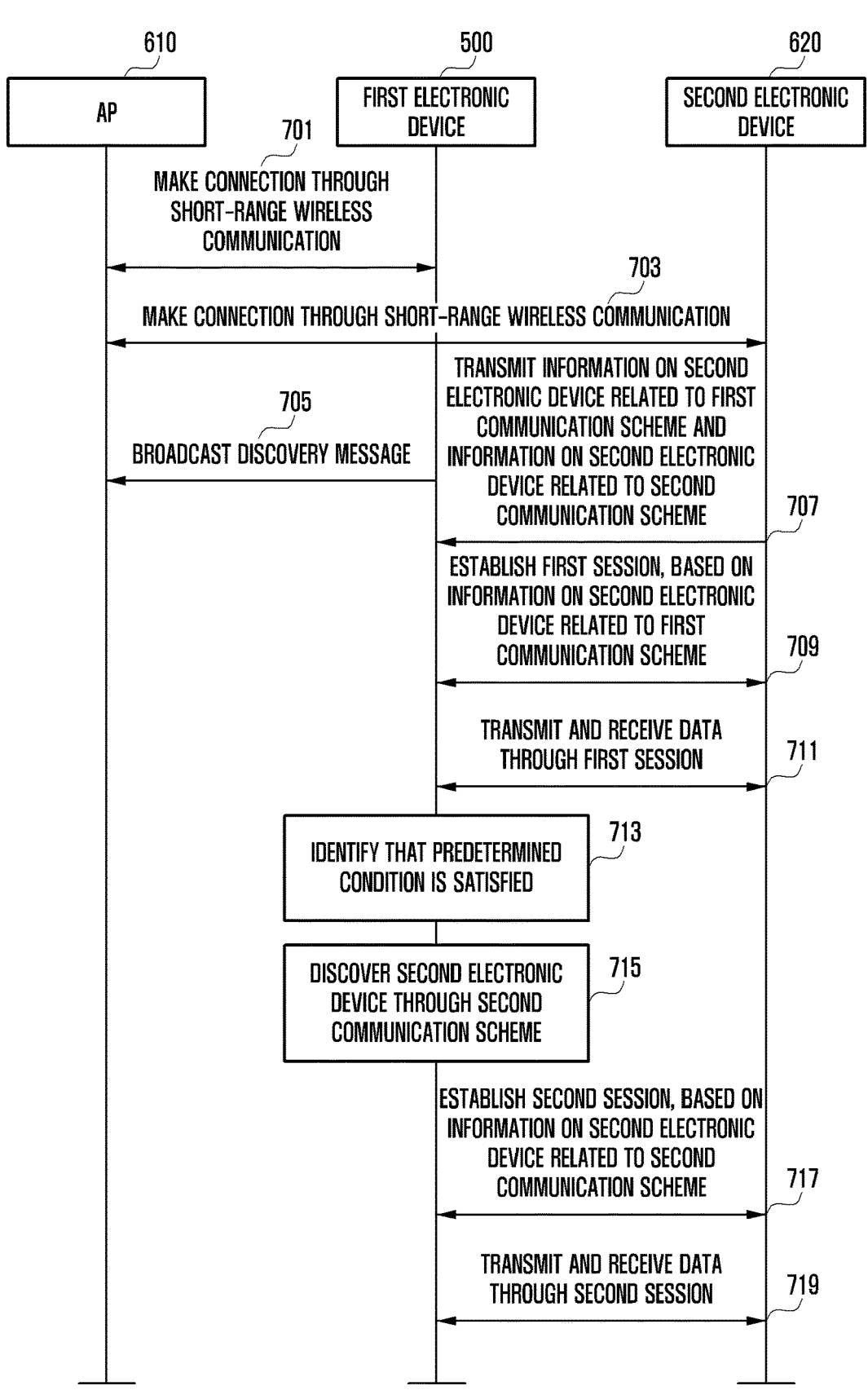
Figure 8:
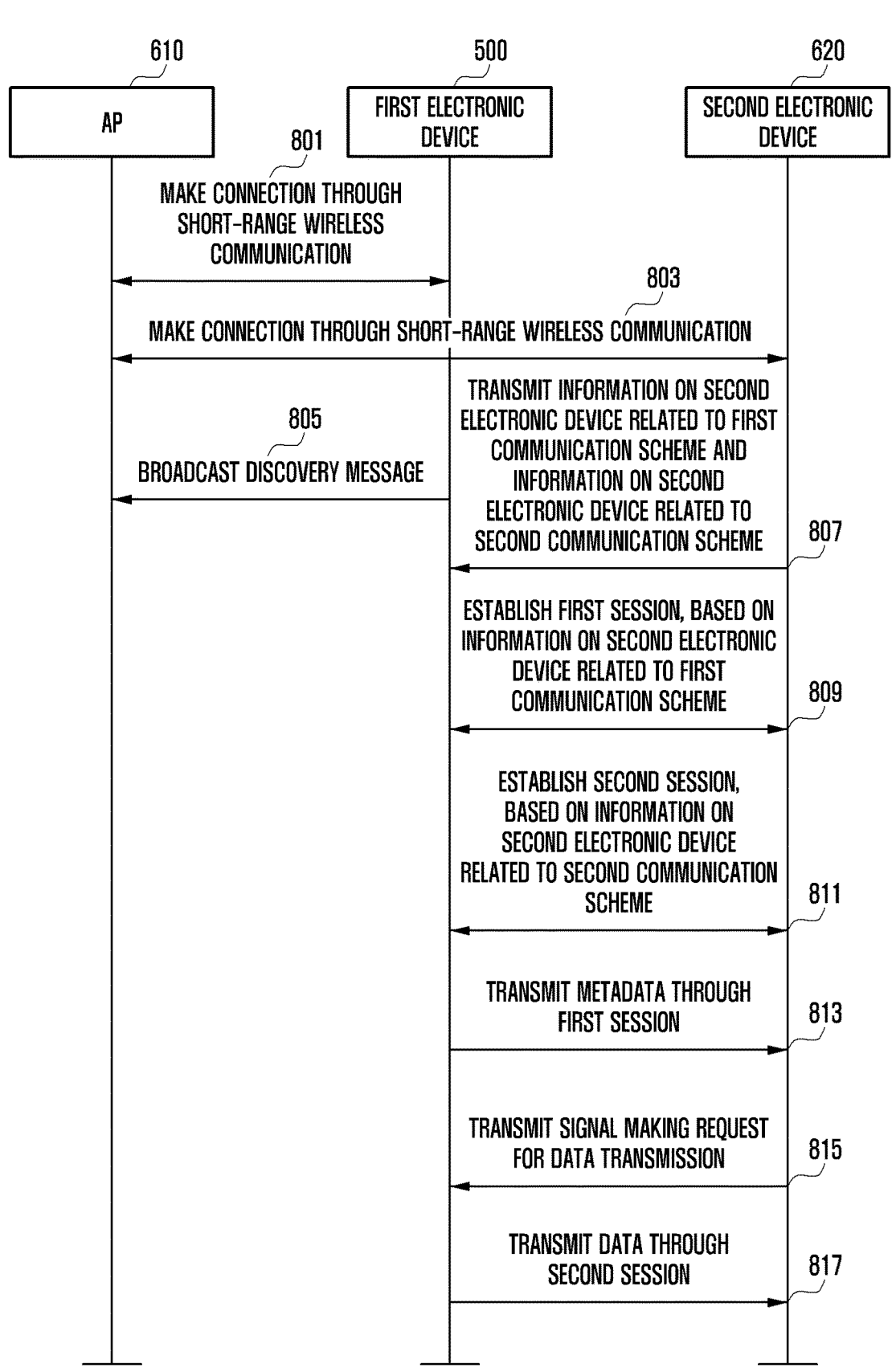

4 from the following description taken in conjunction with the accompanying drawings, in which:

Figure 1:
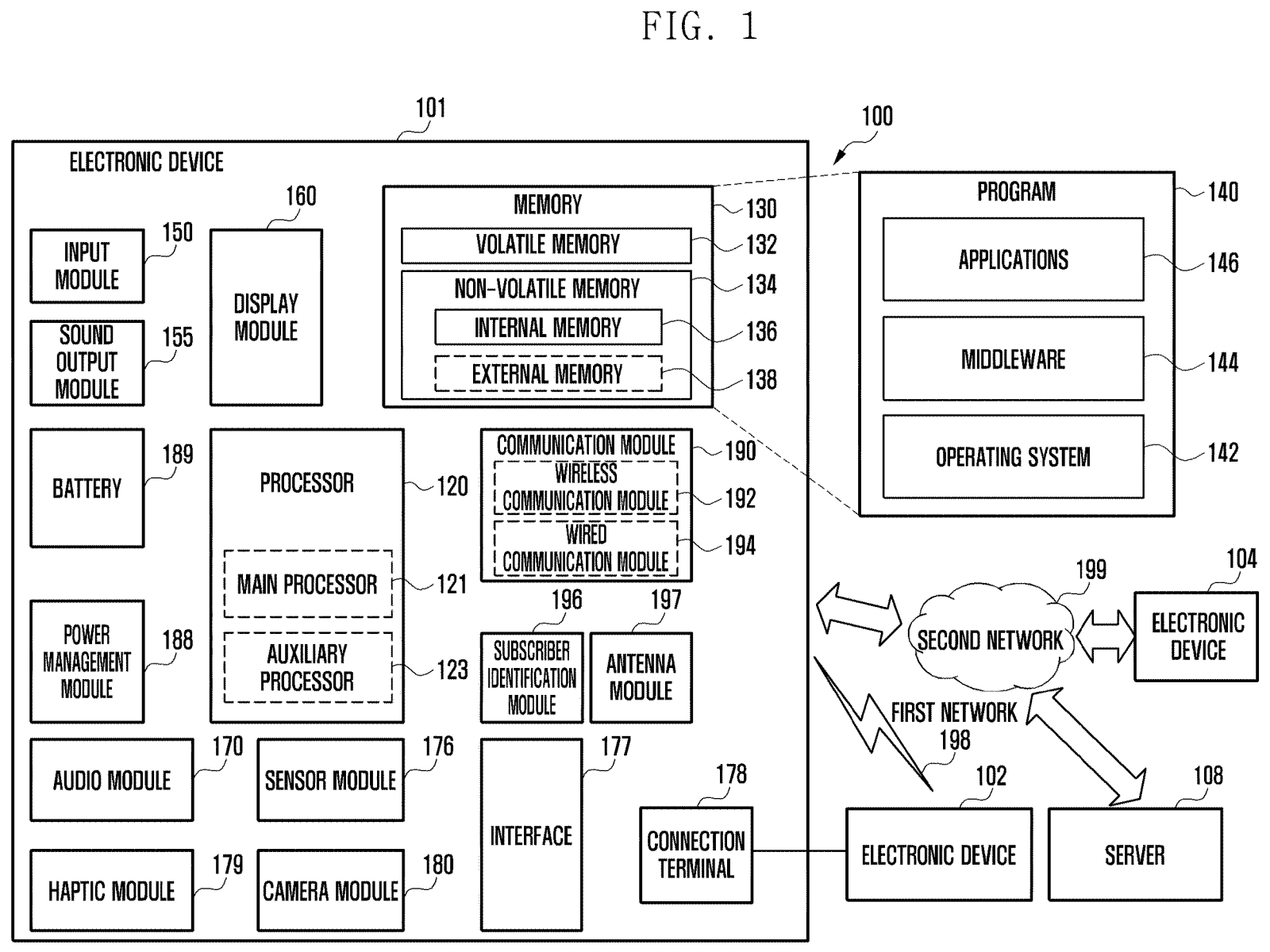

FIG. 1 is a block diagram of an electronic device according to an embodiment of the disclosure;

FIG. 2 is a block diagram illustrating a short-range wireless communication system according to an embodiment of the disclosure;

FIG. 3A illustrates an embodiment of configuring a tunneled direct link setup between electronic devices according to an embodiment of the disclosure;

FIG. 3B illustrates an embodiment in which the electronic device and an external electronic device are connected through Wi-Fi direct according to an embodiment of the disclosure;

FIG. 3C illustrates a neighbor awareness network (NAN) cluster according to an embodiment of the disclosure;

FIG. 4 illustrates an embodiment in which the electronic device transmits and/or receives data in the state in which the configured tunneled direct link setup (TDLS) ends according to an embodiment of the disclosure;

FIG. 5 is a block diagram of an electronic device according to an embodiment of the disclosure;

FIG. 6 illustrates an embodiment in which the electronic device establishes the second session in the state in which the established first session ends according to an embodiment of the disclosure;

FIG. 7 illustrates an embodiment in which the electronic device establishes the second session in the state in which the established first session satisfies the predetermined condition according to an embodiment of the disclosure;

FIG. 8 illustrates an embodiment in which the electronic device establishes both a first session and a second session according to an embodiment of the disclosure; and FIG. 9 is a flowchart illustrating a method of operating an electronic device according to an embodiment of the disclosure.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device (or module) 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device (or module) 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device (or module) 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting (or connection) terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plural-ity of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

FIG. 2 is a block diagram illustrating a short-range wireless communication system according to an embodiment of the disclosure.

Referring to FIG. 2, a wireless local area network (WLAN) system 200 may include an access point (AP) 210, a first electronic device 220, and/or a second electronic device 230.

The first electronic device 220 may perform wireless communication with the AP 210 through short-range wireless communication. The second electronic device 230 may perform wireless communication with the AP 210 through short-range wireless communication. The short-range wireless communication may be a communication scheme supported by all of the first electronic device 220, the second electronic device 230, and/or the AP 210. For example, the wireless communication may be Wi-Fi. The AP 210 may serve as a base station providing wireless communication to at least one electronic device (for example, the first electronic device 220 and the second electronic device 230) located within a communication radius of the WLAN system 200. For example, the AP 210 may include an access point (AP) of IEEE 802.11. The first electronic device 220 and the second electronic device 230 may include a station (STA) of IEEE 802.11.

Short-range wireless communication used by the first electronic device 220 and/or the AP 210 to exchange data may use various frequency bands including a first frequency band (for example, 2.4 gigahertz (GHz)), a second frequency band (for example, 5. GHz), and/or a third frequency band (for example, 6 GHz). The first electronic device 220 and/or the AP 210 may establish a channel included in one of the plurality of frequency bands and exchange data through the established channel.

The first electronic device 220 and the second electronic device 230 may be directly connected through short-range wireless communication without passing through separate entities (for example, the AP 210). A communication scheme through which the first electronic device 220 and the second electronic device 230 are directly connected without passing through separate entities may be defined as a device to device (D2D) communication scheme. The D2D communication scheme may include a first communication scheme (for example, tunneled direct link setup (TDLS)) for exchanging required data via the AP 210 during a process of setting up (or establishing) a communication channel between the first electronic device 220 and the second electronic device 230 and a second communication scheme (for example, Wi-Fi direct or neighbor awareness network (NAN)) for exchanging required data without passing through the AP 210 during a process of setting up (or establishing) a communication channel between the first electronic device 220 and the second electronic device 230.

FIG. 3A illustrates an embodiment of configuring a tunneled direct link setup between electronic devices according to an embodiment of the disclosure.

The TDLS is a D2D communication scheme defined in IEEE 802.11z and may be a communication scheme for transmitting or receiving data between STAs without passing through the AP 210. The first electronic device 220 and the second electronic device 230 may establish a direct communication channel without passing through the AP 210 and transmit or receive data through the established communication channel. The first electronic device 220 and the second electronic device 230 may exchange data required for establishing the communication channel using the TDLS scheme through the AP 210.

The first electronic device 220 may transmit a TDLS discovery message to the AP 210 in operation 301. The TDLS discovery message may be a message for discovering an external electronic device (for example, the second electronic device 230) to be connected with the first electronic device 220 through the TDLS scheme. The TDLS discovery message may include information on the first electronic device 220 related to the TDLS scheme (for example, an address of the first electronic device 220, capability information of the first electronic device 220, information on a channel (or a frequency band) supported by the first electronic device 220, and/or a channel (or a frequency band) preferred by the first electronic device 220). The AP 210 may transmit the TDLS discovery message received from the first electronic device 220 to the second electronic device 230 in operation 303.

The second electronic device 230 may receive the TDLS discovery message generated by the first electronic device 220 from the AP 210. The second electronic device 230 may identify information on the first electronic device 220 related to the TDLS scheme included in the TDLS discovery message and generate a TDLS discovery response message.

The TDLS discovery response message may include information on the second electronic device 230 related to the TDLS scheme (for example, an address of the second electronic device 230, capability information of the second electronic device 230, information on a channel (or a frequency band) supported by the second electronic device 230, and/or a channel (or a frequency band) preferred by the second electronic device 230).

The second electronic device 230 may transmit the TDLS discovery response message to the first electronic device 220 in operation 305.

The first electronic device 220 may receive the TDLS discovery response message from the second electronic device 230 and identify the information on the second electronic device 230 (for example, the address of the second electronic device 230, the capability information of the second electronic device 230, the information on the channel (or a frequency band) supported by the second electronic device 230, and/or the channel (or a frequency band) preferred by the second electronic device 230) included in the TDLS discovery response message. The first electronic device 220 may determine a channel supporting the TDLS scheme on the basis of the information on the second electronic device 230. For example, the first electronic device 220 may select a channel corresponding to a frequency (or number) preferred by the second electronic device 230 and use the selected channel as a communication channel between the first electronic device 220 and the second electronic device 230.

The first electronic device 220 may transmit a TDLS setup message to the AP 210 in operation 307. The TDLS setup message may include identification information of the selected channel. The AP 210 may transmit the TDLS setup message received from the first electronic device 220 to the second electronic device 230 in operation 309.

The second electronic device 230 may identify the identification information of the channel included in the TDLS setup message and perform a series of operations to be connected to the first electronic device 220 through the selected channel. After performing the series of operations to be connected to the first electronic device 220 through the selected channel, the second electronic device 230 may transmit a TDLS setup response message to the AP 210 in operation 311. The AP 210 may transmit the TDLS setup response message received from the second electronic device 230 to the first electronic device 220 in operation 313.

After receiving the TDLS setup response message from the AP 210, the first electronic device 220 may transmit a TDLS confirmation message (or a TDLS setup confirm message) indicating that the TDLS setup response message is identified (or received) to the AP 210 in operation 315. The AP 210 may transmit the TDLS confirmation message transmitted by the first electronic device 220 to the second electronic device 230 in operation 317.

The first electronic device 220 and the second electronic device 230 may perform data communication through the selected channel in operation 319.

Referring to the above-described embodiment, the first electronic device 220 may discover an electronic device to be connected through the TDLS scheme among electronic devices (for example, the second electronic device 230) connected to the AP 210. Accordingly, the TDLS scheme may implement a relatively fast discovery speed in compared to other communication schemes. However, the TDLS scheme may discover only electronic devices connected to an AP which is the same as the AP 210 connected to the first electronic device 220, and the connection of the channel implemented through the TDLS scheme may be released when the first electronic device 220 changes the connected AP.

FIG. 3B illustrates an embodiment in which the first electronic device and the second electronic device are connected through Wi-Fi direct according to an embodiment of the disclosure.

FIG. 3B illustrates messages exchanged during negotiation for determining a group owner (GO) performed while the first electronic device (for example, the first electronic device 220 of FIG. 2) and the second electronic device (for example, the second electronic device 230 of FIG. 2) are connected through short-range wireless communication (for example, Wi-Fi direct).

The first electronic device 220 may transmit a GO negotiation request message to the second electronic device 230 in operation 331.

The first electronic device 220 may discover an external electronic device (for example, the second electronic device 230) to be connected through short-range wireless communication during a discovery procedure and transmit the GO negotiation request message to the discovered second electronic device 230.

The GO negotiation request message may include P2P IE information and Wi-Fi simple configuration information element (WSC IE) information. The P2P IE information may include GO intent and operating channel attribute information which can be used for determining the GO. The operating channel attribute may include preferred channel information corresponding to information related to a channel preferred by the first electronic device 220 among channels which can be established between the first electronic device 220 and the second electronic device 230 and/or preferred frequency band information corresponding to information related to a frequency band preferred by the first electronic device 220. The preferred channel information may be included in a channel number field of an operating channel attribute field. The preferred frequency band information may be included in an operating class field of the operating channel attribute field.

The second electronic device 230 may transmit a GO negotiation response message to the first electronic device 220 in operation 333.

The GO negotiation response message may include P2P IE information and WSC IE information. The P2P IE information may include GO intent and operating channel attribute information which can be used for determining the GO. The operating channel attribute may include preferred channel information corresponding to information related to a channel preferred by the second electronic device 220 among channels which can be established between the first electronic device 230 and the second electronic device 230 and/or preferred frequency band information corresponding to information related to a frequency band preferred by the second electronic device 230. The preferred channel information may be included in a channel number field of an operating channel attribute field. The preferred frequency band information may be included in an operating class field of the operating channel attribute field.

The first electronic device 220 may receive the GO negotiation response message and compare a GO intent included in the GO negotiation response message with a GO intent included in the GO negotiation request message. The electronic device transmitting a larger GO intent may be a group owner (GO), and the electronic device transmitting a smaller GO intent may be a group client (GC). In the short-range wireless communication system, the GO may operate as a host and the GC may operate as a client. For convenience of description, it is assumed that the first electronic device 220 serves as the GO.

The first electronic device 220 may select a channel to be used for the connection between the first electronic device 220 and the second electronic device 230 on the basis of the preferred channel of the first electronic device 220, the preferred frequency band of the first electronic device 220, the preferred channel of the second electronic device 230, and/or the preferred frequency band of the second electronic device 230.

The first electronic device 220 may transmit a GO negotiation confirmation message to the second electronic device 230 in operation 335. The GO negotiation confirmation message may include information on the selected channel.

Referring to the above-described embodiment, when discovering an electronic device to be connected through the Wi-Fi direct scheme, the first electronic device 220 may discover various electronic devices (for example, the second electronic device 230) supporting Wi-Fi direct regardless of the AP 210. Accordingly, the Wi-Fi direct scheme may have a relatively slower discovery speed compared to other communication schemes (for example, the TDLS scheme). However, the Wi-Fi direct scheme may not be influenced by a change in a connection state of the AP 210 with the first electronic device 220.

FIG. 3C illustrates a neighbor awareness network (NAN) cluster according to an embodiment of the disclosure.

FIG. 3C illustrates a configuration example of a neighbor awareness network (NAN) cluster 350 for a proximity network according to various embodiments. In the following description, the cluster 350 may be a set of electronic devices 360, 370, 380, or 390 included in the proximity network in which the respective electronic devices (or NAN devices) 360, 370, 380, or 390 (for example, the electronic device 101 of FIG. 1) transmit and receive data. For example, the cluster 350 may be referred to as a NAN cluster according to the NAN standard.

Referring to FIG. 3C, the cluster 350 may include a plurality of electronic devices 360, 370, 380, or 390. The electronic devices 360, 370, 380, or 390 included in the cluster 350 may transmit and receive a beacon (or a discovery beacon) and/or a service discovery frame (SDF) (hereinafter, referred to as an 'SDF') within synchronized time duration (or communication duration) (for example, a discovery (or search) window (DW)).

Time clocks of the electronic devices 360, 370, 380, or 390 in the cluster 350 may be synchronized. For example, the electronic devices 360, 370, 380, or 390 may be synchronized with a time clock of one electronic device (for example, the electronic device 360) and may exchange beacons and SDFs within the same discovery window.

According to an embodiment, the electronic device supporting a NAN-based low-energy short-range wireless communication technology may broadcast a discovery signal (for example, a beacon) for discovering another electronic device in every preset first period (for example, about 100 msec) and perform scanning in every preset second period (for example, about 10 msec) to receive discovery signals broadcasted from other electronic devices.

The electronic devices 360, 370, 380, and 390 may detect at least one other electronic device located around the electronic device on the basis of the discovery signals received through the scanning and perform NAN cluster synchronization with at least one other detected electronic device. The NAN cluster synchronization may include an operation of receiving time clock information of an electronic device representing the NAN cluster in order to allow the electronic devices included in the NAN cluster to transmit and/or receive data in the same channel and/or during the same time.

For example, as illustrated in FIG. 3C, each of the plurality of electronic devices 360, 370, 380, or 390 may transmit the beacon and receive the beacon from another electronic device 360, 370, 380, or 390, so as to configure one cluster 350 operating according to the synchronized time clock, and the electronic devices 360, 370, 380, or 390 within the cluster 350 may perform NAN cluster synchronization.

Each of the electronic devices 360, 370, 380, or 390 in the cluster 350 may operate in an active state only during a discovery window and operate in a low-power state (for example, a sleep state) during the remaining intervals other than the discovery window, thereby reducing power consumption.

For example, the discovery window may be a time (for example, millisecond) for which the electronic device becomes an active state (or a wake state) and have much power consumption, but the electronic device may maintain the sleep state and can perform low-energy discover in the intervals other than the discovery window.

The electronic devices 360, 370, 380, or 390 in the cluster 350 may simultaneously activate at a start time point of the synchronized discovery window (for example, DW start) and simultaneously switch to the sleep state at an end time point of the discovery window (for example, DW end).

FIG. 4 illustrates an embodiment in which the electronic device transmits and/or receives data in the state in which the configured TDLS ends according to an embodiment of the disclosure.

Referring to FIG. 4, a first electronic device (for example, the first electronic device 220 of FIG. 2) and an AP (for example, the AP 210 of FIG. 2) may be connected through short-range wireless communication in operation 410.

The first electronic device 220 may perform wireless communication with the AP 210 through short-range wireless communication. The short-range wireless communication may be a communication scheme supported by both the first electronic device 220 and/or the AP 210. For example, the wireless communication may be Wi-Fi. The AP 210 may serve as a base station providing wireless communication to at least one electronic device (for example, the first electronic device 220 and the second electronic device 230) located within a communication radius of a WLAN system (for example, the WLAN system 200 of FIG. 2).

A second electronic device (for example, the second electronic device 230 of FIG. 2) and the AP 210 may be connected through short-range wireless communication in operation 420.

The second electronic device 230 may perform wireless communication with the AP 210 through short-range wireless communication.

The first electronic device 220 and/or the second electronic device 230 may perform a series of operations for performing direct communication (for example, D2D) without passing through the AP 210 due to the generation of various situations. According to an embodiment, the first electronic device 220 and/or the second electronic device 230 may perform a series of operations for detecting execution of a specific application requiring direct communication between electronic devices (for example, an application sharing data, an application sharing content, or an application supporting mirroring) or execution of a function supported by a specific application and performing direct communication between devices. The series of operations for performing direct communication between devices may include an operation of discovering an electronic device to be connected through direct communication, an operation of receiving information on devices (for example, capability information including whether the devices support direct communication, a frequency band supported by the devices, and/or channel information supported by the devices) for generating a session (or a channel) supporting direct communication, and an operation of generating a session (or a channel) on the basis of the information on the devices. Hereinafter, it is assumed that the first electronic device 220 and the second electronic device 120 perform direct communication through the tunneled direct link setup (TDLS) scheme. When direct communication is performed through the TDLS scheme, it is possible to reduce the time spent for discovering the electronic device to be connected through direct communication compared to other direct communication (for example, Wi-Fi direct and NAN).

The first electronic device 220 may transmit information on the first electronic device 220 to the AP 210 through a channel generated between the first electronic device 220 and the AP 210, and the AP 210 may transmit information on the first electronic device 220 to the second electronic device 230 through a channel generated between the second electronic device 230 and the AP 210. The second electronic device 230 may transmit information on the second electronic device 230 to the AP 210 through a channel generated between the second electronic device 230 and the AP 210, and the AP 210 may transmit information on the second electronic device 220 to the first electronic device 220 through a channel generated between the first electronic device 220 and the AP 210.

The first electronic device 220 and the second electronic device 230 may establish a first session in operation 430.

The first session may be a session generated through the TDLS scheme and may be a channel of a frequency band supported by both the first electronic device 220 and the second electronic device 230.

The first electronic device 220 and the second electronic device 230 may transmit and/or receive data through the first session in operation 440.

The first electronic device 220 and/or the second electronic device 230 may detect the end of the first session in operation 450.

According to an embodiment, the first electronic device 220 and/or the second electronic device 230 may not simultaneously transmit or receive data through different schemes of the same short-range wireless communication. For example, the first electronic device 220 and/or the second electronic device 230 may not simultaneously transmit or receive data through different schemes (for example, Wi-Fi direct or NAN) in the state in which data is transmitted or received through the TDLS scheme. When transmitting or receiving data to or from another electronic device through different schemes of short-range wireless communication (for example, Wi-Fi direct or NAN) in the state in which the data is transmitted or received through the first session, the first electronic device 220 and/or the second electronic device 230 may end the first session.

According to an embodiment, when being connected to an AP different from the currently connected AP 210, the first electronic device 220 and/or the second electronic device 230 may end the first session. The TDLS scheme may support direct communication between electronic devices connected to the same AP and may not support direct communication between electronic devices connected to different APs.

According to an embodiment, the first electronic device 220 and/or the second electronic device 230 may end the first session in the state in which the first electronic device 220 and/or the second electronic device 230 exceeds the maximum number of supported sessions. For example, when the first electronic device 220 supporting a maximum of one TDLS connection makes the TDLS connection with another electronic device in the state in which the first electronic device 220 is connected to the second electronic device 220 through the first session of the TDLS scheme, the first session may be ended.

The first electronic device 220 and/or the second electronic device 230 may transmit or receive data via the AP 210 as the first session ends. According to an embodiment, the data which the first electronic device 220 transmits to the second electronic device 230 may be transmitted through the channel generated between the first electronic device 220 and the AP 210 and the channel generated between the AP 210 and the second electronic device 230. The data which the second electronic device 230 transmits to the first electronic device 220 may be transmitted through the channel generated between the second electronic device 230 and the AP 210 and the channel generated between the AP 210 and the first electronic device 220.

The first electronic device 220 may transmit data to be transmitted to the second electronic device 230 to the AP 210 in order to transmit data to the second electronic device 230 in operation 460.

The AP 210 may transmit the data transmitted by the first electronic device 220 to the second electronic device 230 in operation 470.

The above-described embodiment may be an embodiment in which the first electronic device 220 and the second electronic device 230 transmit or receive data through the AP 210 in the state in which the session generated between the first electronic device 220 and the second electronic device 230 ends. However, when the data is transmitted or received through the AP 210, a transmission rate and/or a reception rate may be relatively lower than the case in which the data is transmitted or received through the first session generated between the first electronic device 220 and the second electronic device 230. Accordingly, the quality of service using the first session may deteriorate or the service may end due to the end of the first session.

Hereinafter, an embodiment of reducing or preventing a decrease in the transmission speed and/or reception speed by configuring other direct communication according to the end of the first session is described.

FIG. 5 is a block diagram illustrating a first electronic device according to an embodiment of the disclosure.

Referring to FIG. 5, according to various embodiments of the disclosure, a first electronic device 500 (for example, the first electronic device 220 of FIG. 2) may include a communication circuit 510 (for example, the wireless communication module 192 of FIG. 1) and a processor 520 (for example, the processor 120 of FIG. 1).

The communication circuit 510 may be a communication circuit for supporting short-range wireless communication. The communication circuit 510 may include various circuit structures used for modulating and/or demodulating a signal within the first electronic device 500. For example, the communication circuit 510 may modulate a signal in a baseband into a signal in a radio frequency (RF) band to output the signal through an antenna (not shown) or demodulate the signal in the RF band received through the antenna into the signal in the baseband, and transmit the signal to the processor 520.

The communication circuit 510 may perform short-range wireless communication through a first frequency band (for example, 2.4 GHz), a second frequency band (for example, 5 GHz) corresponding to a frequency band higher than the first frequency band, and/or a third frequency band (for example, 6 GHz) corresponding to a frequency band higher than the second frequency band.

The communication circuit 510 may be connected to an AP (for example, the AP 210 of FIG. 2) through one of a plurality of frequency bands including the first frequency band, the second frequency band, and/or the third frequency band to transmit data to the AP 210 or receive data transmitted by the AP 210.

The communication circuit 510 may perform an operation for receiving a signal transmitted by an external electronic device on the basis of the control of the processor 520. The communication circuit 510 may receive a signal making a request for transmitting and/or receiving data through a specific channel from the processor 520 and control elements (for example, a low-noise amplifier, a switch, and/or a filter) of the communication circuit 510 to receive a signal through a frequency band corresponding to the specific channel.

The processor 520 may receive data transmitted by an application processor (for example, the processor 120 of FIG. 1) and perform an operation of generating a packet for transmitting the received data to the external electronic device 320. The processor 520 may be defined as a communication processor included in a communication module (for example, the wireless communication module 192 of FIG. 1). According to an embodiment, the processor 520 may generate a packet by performing channel coding based on data transmitted by the application processor 120, identify whether there is an error in at least some of the data transmitted by the external electronic device, or perform an operation of recovering the error (for example, hybrid auto repeat request (HARQ)) when the error occurs.

The processor 520 may be operatively connected to the communication circuit 510 and may control the operation of the communication circuit 510.

The application processor 120 may execute an application installed in a memory (for example, the memory 130 of FIG. 1) of the first electronic device 500. The executed application may be an application performing a specific service (for example, content sharing and/or data transmission) through short-range wireless communication. The specific service may be a service requiring an operation of transmitting and/or receiving data through a session to be generated between the first electronic device 500 and an external electronic device (for example, the second electronic device 230 of FIG. 3A).

The processor 520 may perform a series of operations for making a direct communication (D2D) connection through short-range wireless communication between the first electronic device 500 and the external electronic device for the specific service provided by the application according to the execution of the application. The direct connection through the short-range wireless communication between the first electronic device 500 and the external electronic device may include a first communication scheme (for example, a TDLS scheme) corresponding to a communication scheme for configuring (or setting up) a communication channel on the basis of data transmitted or received through the AP 210 and a second communication scheme (for example, Wi-Fi direct and/or NAN) corresponding to a communication scheme for configuring (or setting up) a communication channel on the basis of data transmitted or received between the first electronic device 500 and the external electronic device without passing through the AP 210. The first communication scheme may mainly discover external electronic devices connected to the AP 210 and thus provide a faster discovery speed compared to the second communication scheme that does not limit discovery targets. Accordingly, the processor 520 may discover an external electronic device to be connected through the first communication scheme in order to more rapidly provide a service.

The processor 520 may discover (for example, TDLS discovery or AP-based discovery (for example, layer 3-based discovery protocol (for example, universal plug and play (UPnP), multicast domain name service (mDNS), or bonjour)) the second electronic device 230 to be connected with the first electronic device 500 through the first communication scheme. The external electronic device 230 discovered through the first communication scheme may be in the connected state with the AP 210 connected to the first electronic device 500. The processor 520 may broadcast a discovery message (for example, a TDLS discover message) through a channel connected between the first electronic device 500 and the AP 210.

The discovery message may include information on the first electronic device 500 related to the first communication scheme (for example, an address of the first electronic device 500, capability information of the first electronic device 500, a channel (or a frequency band) supported by the first electronic device 500, and/or a channel (or a frequency band) preferred by the first electronic device 500). The address of the first electronic device 500 included in the discovery message is an address used when data is received through the first communication scheme and may include a media access control (MAC) address or an Internet Protocol (IP) address. The capability information of the first electronic device 500 included in the discovery message is capability information related to the first communication scheme and may include, for example, a frequency band supported by the first electronic device 500, a channel band, and/or the maximum number of sessions which can be generated.

The second electronic device 230 receiving the discovery message through the AP 210 may identify information on the first electronic device 500 related to the first communication scheme included in the discovery message and generate a discovery response message corresponding to the discovery message. The discovery response message may include information on the second electronic device 230 related to the first communication scheme (for example, an address of the second electronic device 230, capability information of the second electronic device 230, a channel (or a frequency band) supported by the second electronic device 230, and/or a channel (or a frequency band) preferred by the second electronic device 230). The address of the second electronic device 230 included in the discovery response message is an address used when data is received through the first communication scheme and may include a MAC address and an IP address. The capability information of the second electronic device 230 included in the discovery message is capability information related to the first communication scheme may include, for example, a frequency band supported by the second electronic device 230, a channel band, and the maximum number of sessions which can be generated.

The second electronic device 230 may transmit the discovery response message corresponding to the discovery message to the first electronic device 500 through the channel connected between the second electronic device 230 and the AP 210.

According to another embodiment, through another short-range wireless communication (for example, Bluetooth low energy (BLE), Bluetooth, and/or ultra wideband (UWB)) scheme, the processor 520 may discover the second electronic device 230 to be connected through the first communication scheme. The first electronic device 500 may further include a second communication circuit (not shown) supporting other short-range wireless communication, and the processor 520 may control the second communication circuit to perform a process of discovering the second electronic device 230 to be connected through the first communication scheme.

The processor 520 may generate the first session corresponding to the first communication scheme with the second electronic device 230 discovered during the discovery process on the basis of information on the second electronic device 230 related to the first communication scheme and control the communication circuit 510 to transmit or receive data through the first session.

The first electronic device 500 according to various embodiments of the disclosure may acquire and store information related to a second communication scheme different from the first communication scheme in order to rapidly make another direct connection (D2D) between devices in the state in which the first communication scheme cannot be supported by various factors. The first electronic device 500 may generate a second session supporting the second communication scheme with the second electronic device 230 on the basis of information on the second electronic device 230 related to the second communication scheme on the basis of identification that the first session satisfies the predetermined condition and control the communication circuit 510 to transmit or receive data through the second session. Hereinafter, a process of acquiring information related to the second communication scheme and an embodiment of switching the first communication scheme to the second communication scheme on the basis of the information related to the second communication scheme are described.

The first electronic device 500 may acquire information on the second electronic device 230 related to the second communication scheme during a process of generating the first session.

According to an embodiment, the information on the second electronic device 230 related to the second communication scheme may be included in the discovery response message.

The discovery response message may include information on the second electronic device 230 related to the second communication scheme (for example, an address of the second electronic device 230, capability information of the second electronic device 230, a channel (or a frequency band) supported by the second electronic device 230, and/or a channel (or a frequency band) preferred by the second electronic device 230). The address of the second electronic device 230 included in the discovery response message is an address used when data is received through the second communication scheme and may include a MAC address and an IP address. The capability information of the second electronic device 230 included in the discovery message is capability information related to the second communication scheme and may include, for example, a frequency band supported by the second electronic device 230, a channel band, and the maximum number of sessions which can be generated.

The information on the second electronic device 230 related to the second communication scheme may be included not only the discovery response message but also various messages transmitted by the second electronic device 230.

The first electronic device 500 may transmit information on the first electronic device 500 related to the second communication scheme to the second electronic device 230 during the process of generating the first session.

According to an embodiment, the discovery message generated and/or transmitted during the process of generating the first session may include not only information on the first electronic device 500 related to the first communication scheme but also information on the first electronic device 500 related to the second communication scheme different from the first communication scheme.

The discovery message may include information on the first electronic device 500 related to the second communication scheme (for example, an address of the first electronic device 500, capability information of the first electronic device 500, a channel (or a frequency band) supported by the first electronic device 500, and a channel (or a frequency band) preferred by the first electronic device 500). The address of the first electronic device 500 included in the discovery message is an address used when data is received through the second communication scheme and may include a MAC address or an IP address. The capability information of the first electronic device 500 included in the discovery message is capability information related to the second communication scheme and may include, for example, a frequency band supported by the first electronic device 500, a channel band, and/or the maximum number of sessions which can be generated.

The processor 520 may receive information on the second electronic device 230 related to the first communication scheme and/or information on the second electronic device 230 related to the second communication scheme and generate the first session on the basis of the information on the second electronic device 230 related to the first communication scheme. The first session is a session generated on the basis of the first communication scheme and may be a session for direct communication between the first electronic device 500 and the second electronic device 230.

The processor 520 may transmit data to the second electronic device 230 through the first session or receive data transmitted by the second electronic device 230 through the first session.

The processor 520 may identify whether the first electronic device 500 satisfies a predetermined condition and discover the second electronic device 230 on the basis of the information on the second electronic device 230 related to the second communication scheme according to the first electronic device 500 satisfying the predetermined condition. The predetermined condition may include a condition for switching the first communication scheme to the second communication scheme.

According to an embodiment, the predetermined condition may include a condition for ending the first session.

The first electronic device 500 may not simultaneously transmit or receive data through different schemes of the same short-range wireless communication. For example, the first electronic device 500 may not simultaneously transmit or receive data through the second communication scheme in the state in which data is transmitted or received through the first communication scheme. When the first electronic device 500 transmits or receives data to or from another electronic device through the second communication scheme in the state in which data is transmitted or received through the first session, the first electronic device 500 may determine that the first session can be ended and the predetermined condition is satisfied. When the first electronic device 500 is connected to an AP different from the currently connected AP 210, the first electronic device 500 may end the first session. The first communication scheme may support direct communication between electronic devices connected to the same AP but not support direct communication between electronic devices connected to different APs. When the first electronic device 500 is connected to another AP in the state in which data is transmitted or received through the first session, it may be determined that the first session can be ended and the predetermined condition is satisfied. The first electronic device 500 may end the first session on the basis of identification that the currently executed application is required to transmit or receive data to or from another electronic device through the second communication scheme in the state in which data is transmitted or received through the first session.

The first electronic device 500 may end the first session in the state in which the communication circuit 510 exceeds the maximum number of supported sessions. For example, when the first electronic device 500 including the communication circuit 510 supporting a maximum of one TDLS connection makes a connection with another electronic device through the first communication scheme in the state in which the first electronic device 500 is connected to the second electronic device 230 through the first session, it may be determined that the first session can be ended and the first session satisfies the predetermined condition.

According to an embodiment, the predetermined condition may include a condition indicating that data transmitted or received through the first session has a predetermined data type (for example, video) or has a predetermined size or larger.

The processor 520 may identify a part (for example, metadata or header) of the data transmitted or received through the first session and determine that the predetermined condition is satisfied on the basis of identification that the data type corresponds to a predetermined type.

The processor 520 may identify a part (for example, metadata or header) of the data transmitted or received through the first session and determine that the predetermined condition is satisfied on the basis of identification that the data size is larger than or equal to a predetermined size.

The processor 520 may identify a part (for example, metadata or header) of the data transmitted or received through the first session and determine that the predetermined condition is satisfied on the basis of identification that the data is data for a preview displayed on or output to the second electronic device 230 receiving the data.

According to an embodiment, the predetermined condition may include a condition indicting that the quality of service (QoS) of the first session is equal to or lower than a predetermined value.

The processor 520 may identify the quality (for example, reference signals received power (RSRP)) of the signal transmitted through the first session and determine that the predetermined condition is satisfied on the basis of identification that the quality is equal to or smaller than a predetermined value.

According to an embodiment, the predetermined condition may include a condition indicating that the QoS of the channel generated between the first electronic device 500 and the AP 210 is equal to or lower than a predetermined value.

The processor 520 may identify the quality (for example, RSRP) of the signal transmitted by the AP 210 and determine that the predetermined condition is satisfied on the basis of identification that the quality is equal to lower than a predetermined value.

The processor 520 may perform a series of operations for switching the first communication scheme to the second communication scheme on the basis of satisfaction of the predetermined condition.

The processor 520 may control the communication circuit 510 to transmit and/or receive data through the second communication scheme on the basis of satisfaction of the predetermined condition. The processor 520 may control the communication circuit 510 to discover the second electronic device 230 through the second communication scheme.

According to an embodiment, the processor 520 may discover the second electronic device 230 on the basis of information on the second electronic device 230 related to the second communication scheme. For example, the processor 520 may discover the second electronic device 230 in a frequency band supported by the second electronic device 230 on the basis of the information on the second electronic device 230 related to the second communication scheme. The first electronic device 500 may acquire in advance the information on the second electronic device 230 related to the second communication scheme during the process of generating the first session, thereby reducing the time spent for discovering the second electronic device 230 through the second communication scheme.

According to an embodiment, the processor 520 may discover at least one external electronic device supporting the second communication scheme. The processor 520 may select the second electronic device 230 to be connected through the second communication scheme on the basis of information on an external electronic device related to the second communication scheme among the discovered external electronic devices. For example, the processor 520 may select an external electronic device having an address which is the same as the address (or identification information) of the external electronic device included in the information on the external electronic device related to the second communication scheme among the at least one discovered external electronic device as the second electronic device 230 to be connected through the second communication scheme.

The processor 520 may transmit information indicating data transmission and/or reception through the second communication scheme to the second electronic device 230 through the first session or through the AP 210 on the basis of satisfaction of the predetermined condition.

The processor 520 may perform a series of operations for setting up a second session with the selected (or discovered) second electronic device 230 on the basis of information on the external electronic device related to the second communication scheme.

According to an embodiment, the processor 520 may set up the second session through a channel having a frequency band (or a preferred channel) which can be supported by the second electronic device 230, included in the information on the external electronic device related to the second communication scheme.

The processor 520 may control the communication circuit 510 to transmit or receive data to the second electronic device 230 through the second session.

Through the above scheme, in the state in which data transmission and/or reception through the first communication scheme supporting direct communication between the first electronic device 500 and the second electronic device 230 is not possible, the first electronic device 500 may transmit and/or receive data through the second communication scheme corresponding to other direct communication between the first electronic device 500 and the second electronic device 230, thereby reducing the quality of service being performed or preventing stopping of the service.

The processor 520 may control the communication circuit 510 to transmit and/or receive data to and/or from the second electronic device 230 through the AP 210 on the basis of failure of the setup of the second session. When data is transmitted and/or received through the AP 210, a transmission speed and/or reception speed may be lower than the direct communication between the first electronic device 500 and the second electronic device 230 or stopping of the service may be prevented.

According to another embodiment, the processor 520 may generate the second session on the basis of information on the second electronic device 230 related to the second communication scheme received during the process of generating the first session. The processor 520 may generate the second session regardless of whether the predetermined condition is satisfied and transmit or receive data through the second session.

FIG. 6 illustrates an embodiment in which the electronic device establishes the second session in the state in which the established first session ends according to an embodiment of the disclosure.

Referring to FIG. 6, a first electronic device (for example, the first electronic device 500 of FIG. 5) and an AP 610 (for example, the AP 210 of FIG. 2) may be connected through short-range wireless communication in operation 631.

The first electronic device 500 may perform wireless communication with the AP 610 through short-range wireless communication. The short-range wireless communication may be a communication scheme supported by both the first electronic device 500 and/or the AP 610. For example, the wireless communication may be Wi-Fi. The AP 610 may serve as a base station providing wireless communication to at least one electronic device (for example, the first electronic device 500 and the second electronic device 620) located within a communication radius of a WLAN system (for example, the WLAN system 200 of FIG. 2).

The second electronic device 620 (for example, the second electronic device 230 of FIG. 2) and the AP 610 may be connected through short-range wireless communication in operation 632.

The second electronic device 620 may perform wireless communication with the AP 210 through short-range wireless communication.

The first electronic device 500 and/or the second electronic device 620 may perform a series of operations for performing direct communication (for example, D2D) without passing through the AP 610 due to the generation of various situations. According to an embodiment, the first electronic device 500 and/or the second electronic device 620 may perform a series of operations for detecting execution of a specific application requiring direct communication between electronic devices (for example, an application sharing data, an application sharing content, or an application supporting mirroring) or execution of a function supported by a specific application and performing direct communication between devices.

The first electronic device 500 may discover (for example, TDLS discovery or AP-based discovery (for example, discover using layer 3-based discovery protocol (for example, UPnP, mDNS, or bonjour)) the second electronic device 620 to be connected with the first electronic device 500 through the first communication scheme in operation 633. The second electronic device 620 discovered through the first communication scheme may be in the connected state with the AP 610 connected to the electronic device 500. The first electronic device 500 may broadcast a discovery message (for example, a TDLS discover message) through a channel connected between the first electronic device 500 and the AP 610. For example, the second electronic device 620 may receive the discovery message, which the first electronic device 500 transmits to the AP 610, from the AP 610.

The discovery message may include information on the first electronic device 500 related to the first communication scheme (for example, an address of the first electronic device 500, capability information of the first electronic device 500, a channel (or a frequency band) supported by the first electronic device 500, and/or a channel (or a frequency band) preferred by the first electronic device 500). The address of the first electronic device 500 included in the discovery message is an address used when data is received through the first communication scheme and may include a MAC address or an IP address. The capability information of the first electronic device 500 included in the discovery message is capability information related to the first communication scheme and may include, for example, a frequency band supported by the first electronic device 500, a channel band, and/or the maximum number of sessions which can be generated.

The discovery message may include information on the first electronic device 500 related to the second communication scheme (for example, an address of the first electronic device 500, capability information of the first electronic device 500, a channel (or a frequency band) supported by the first electronic device 500, and/or a channel (or a frequency band) preferred by the first electronic device 500). The address of the first electronic device 500 included in the discovery message is an address used when data is received through the second communication scheme and may include a MAC address or an IP address. The capability information of the first electronic device 500 included in the discovery message is capability information related to the second communication scheme and may include, for example, a frequency band supported by the first electronic device 500, a channel band, and/or the maximum number of sessions which can be generated.

The second electronic device 620 may transmit information on the second electronic device 620 related to the first communication scheme and information on the second electronic device 620 related to the second communication scheme to the first electronic device 500 through the AP 610 in operation 634. The first electronic device 500 may receive the information on the second electronic device 620 related to the first communication scheme and the information on the second electronic device 620 related to the second communication scheme from the second electronic device 620 through the AP 610.

The second electronic device 620 receiving the discovery message through the AP 210 may identify information on the first electronic device 500 related to the first communication scheme included in the discovery message, generate a discovery response message corresponding to the discovery message, and transmit the discovery response message to the first electronic device 500 through the channel connected between the second electronic device 620 and the AP 210.

The discovery response message may include information on the second electronic device 620 related to the first communication scheme (for example, an address of the second electronic device 620, capability information of the second electronic device 620, a channel (or a frequency band) supported by the second electronic device 620, and a channel (or a frequency band) preferred by the second electronic device 620). The address of the second electronic device 620 included in the discovery response message is an address used when data is received through the first communication scheme and may include a MAC address and an IP address. The capability information of the second electronic device 620 included in the discovery message is capability information related to the first communication scheme and may include, for example, a frequency band which can be supported by the second electronic device 620, a channel band, and/or the maximum number of sessions which can be generated.

The discovery response message may include information on the second electronic device 620 related to the second communication scheme (for example, an address of the second electronic device 620, capability information of the second electronic device 620, a channel (or a frequency band) supported by the second electronic device 620, and a channel (or a frequency band) preferred by the second electronic device 620). The address of the second electronic device 620 included in the discovery response message is an address used when data is received through the second communication scheme and may include a MAC address and an IP address. The capability information of the second electronic device 620 included in the discovery message is capability information related to the second communication scheme and may include, for example, a frequency band which can be supported by the second electronic device 620, a channel band, and/or the maximum number of sessions which can be generated.

The first electronic device 500 and the second electronic device 620 may establish the first session on the basis of information on the first electronic device 500 and the second electronic device 620 related to the first communication scheme in operation 635.

The first electronic device 500 may receive information on the second electronic device 620 related to the first communication scheme and/or information on the second electronic device 620 related to the second communication scheme and generate the first session on the basis of the information on the second electronic device 620 related to the first communication scheme. The first session is a session generated on the basis of the first communication scheme and may be a session for direct communication between the first electronic device 500 and the second electronic device 620.

The first electronic device 500 and the second electronic device 620 may transmit and/or receive data through the first session in operation 636.

The first electronic device 500 and/or the second electronic device 620 may detect the end of the first session in operation 637.

The first electronic device 500 may not simultaneously transmit or receive data through different schemes of the same short-range wireless communication. For example, the first electronic device 500 may not simultaneously transmit or receive data through the second communication scheme in the state in which data is transmitted or received through the first communication scheme. The first electronic device

500 may end the first session when the first electronic device 500 transmits or receives data to or from another electronic device through the second communication scheme in the state in which data is transmitted or received through the first session.

When the first electronic device 500 is connected to an AP different from the currently connected AP 610, the first electronic device 500 may end the first session. The first communication scheme may support direct communication between electronic devices connected to the same AP but not support direct communication between electronic devices connected to different APs. When the first electronic device 500 is connected to another AP in the state in which data is transmitted or received through the first session, the first electronic device 500 may end the first session.

When a communication circuit (for example, the communication circuit 510 of FIG. 5) exceeds the maximum number of supported sessions, the first electronic device 500 may end the first session. For example, when the first electronic device 500 including the communication circuit 510 supporting a maximum of one TDLS connection makes a connection with another electronic device through the first communication scheme in the state in which the first electronic device 500 is connected to the second electronic device 620 through the first session, the first electronic device 500 may end the first session.

The first electronic device 500 may discover the second electronic device 620 through the second communication scheme in operation 638.

According to an embodiment, the first electronic device 500 may discover the second electronic device 620 on the basis of information on the second electronic device 620 related to the second communication scheme. For example, the processor 520 may discover the second electronic device 620 in a frequency band supported by the second electronic device 620 on the basis of the information on the second electronic device 620 related to the second communication scheme. The first electronic device 500 may acquire in advance the information on the second electronic device 620 related to the second communication scheme during the process of generating the first session, thereby reducing the time spent for discovering the second electronic device 620 through the second communication scheme.

According to an embodiment, the first electronic device 500 may discover at least one external electronic device supporting the second communication scheme. The first electronic device 500 may select the second electronic device 620 to be connected through the second communication scheme on the basis of information on the second electronic device 620 related to the second communication scheme from among the at least one discovered external electronic device. For example, the processor 520 may select the second electronic device 620 having an address which is the same as the address (or identification information) of the external electronic device included in the information on the external electronic device related to the second communication scheme among the discovered external electronic devices as the second electronic device 620 to be connected through the second communication scheme.

The first electronic device 500 and the second electronic device 620 may establish the second session on the basis of the information on the first electronic device 500 related to the second communication scheme and the information on the second electronic device 620 related to the second communication scheme in operation 639.

According to an embodiment, the first electronic device 500 may set up the second session through a channel having a frequency band (or a preferred channel) which can be supported by the second electronic device 620, included in the information on the external electronic device related to the second communication scheme.

The first electronic device 500 and the second electronic device 620 may transmit and/or receive data through the second session in operation 640.

FIG. 7 illustrates an embodiment in which the electronic device establishes the second session in the state in which the established first session satisfies the predetermined condition according to an embodiment of the disclosure.

Referring to FIG. 7, a first electronic device (for example, the first electronic device 500 of FIG. 5) and the AP 610 (for example, the AP 210 of FIG. 2) may be connected through short-range wireless communication in operation 701.

The first electronic device 500 may perform wireless communication with the AP 610 through short-range wireless communication. The short-range wireless communication may be a communication scheme supported by both the first electronic device 500 and/or the AP 610. For example, the wireless communication may be Wi-Fi. The AP 610 may serve as a base station providing wireless communication to at least one electronic device (for example, the first electronic device 500 and the second electronic device 620) located within a communication radius of a WLAN system (for example, the WLAN system 200 of FIG. 2).

The second electronic device 620 (for example, the second electronic device 230 of FIG. 2) and the AP 610 may be connected through short-range wireless communication in operation 703.

The second electronic device 620 may perform wireless communication with the AP 210 through short-range wireless communication.

The first electronic device 500 and/or the second electronic device 620 may perform a series of operations for performing direct communication (for example, D2D) without passing through the AP 610 due to the generation of various situations. According to an embodiment, the first electronic device 500 and/or the second electronic device 620 may perform a series of operations for detecting execution of a specific application requiring direct communication between electronic devices (for example, an application sharing data, an application sharing content, or an application supporting mirroring) or execution of a function supported by a specific application and performing direct communication between devices.

The first electronic device 500 may discover (for example, TDLS discovery) the second electronic device 620 to be connected to the first electronic device 500 through the first communication scheme in operation 705. The second electronic device 620 discovered through the first communication scheme may be in the connected state with the AP 610 connected to the electronic device 500. The first electronic device 500 may broadcast a discovery message (for example, a TDLS discover message) through a channel connected between the first electronic device 500 and the AP 610.

The discovery message may include information on the first electronic device 500 related to the first communication scheme (for example, an address of the first electronic device 500, capability information of the first electronic device 500, a channel (or a frequency band) supported by the first electronic device 500, and/or a channel (or a frequency band) preferred by the first electronic device 500). The address of the first electronic device 500 included in the discovery message is an address used when data is received through the first communication scheme and may include a MAC address or an IP address. The capability information of the first electronic device 500 included in the discovery message is capability information related to the first communication scheme and may include, for example, a frequency band supported by the first electronic device 500, a channel band, and/or the maximum number of sessions which can be generated.

The discovery message may include information on the first electronic device 500 related to the second communication scheme (for example, an address of the first electronic device 500, capability information of the first electronic device 500, a channel (or a frequency band) supported by the first electronic device 500, and/or a channel (or a frequency band) preferred by the first electronic device 500). The address of the first electronic device 500 included in the discovery message is an address used when data is received through the second communication scheme and may include a MAC address or an IP address. The capability information of the first electronic device 500 included in the discovery message is capability information related to the second communication scheme and may include, for example, a frequency band supported by the first electronic device 500, a channel band, and/or the maximum number of sessions which can be generated.

The second electronic device 620 may transmit information on the second electronic device 620 related to the first communication scheme and information on the second electronic device 620 related to the second communication scheme to the first electronic device 500 through the AP 610 in operation 707. The first electronic device 500 may receive information on the second electronic device 620 related to the first communication scheme and information on the second electronic device 620 related to the second communication scheme from the second electronic device 620 through the AP 610.

The second electronic device 620 receiving the discovery message through the AP 210 may identify information on the first electronic device 500 related to the first communication scheme included in the discovery message, generate a discovery response message corresponding to the discovery message, and transmit the discovery response message to the first electronic device 500 through the channel connected between the second electronic device 620 and the AP 210.

The discovery response message may include information on the second electronic device 620 related to the first communication scheme (for example, an address of the second electronic device 620, capability information of the second electronic device 620, a channel (or a frequency band) supported by the second electronic device 620, and/or a channel (or a frequency band) preferred by the second electronic device 620). The address of the second electronic device 620 included in the discovery response message is an address used when data is received through the first communication scheme and may include a MAC address and an IP address. The capability information of the second electronic device 620 included in the discovery message is capability information related to the first communication scheme and may include, for example, a frequency band which can be supported by the second electronic device 620, a channel band, and/or the maximum number of sessions which can be generated.

The discovery response message may include information on the second electronic device 620 related to the second communication scheme (for example, an address of the second electronic device 620, capability information of the second electronic device 620, a channel (or a frequency band) supported by the second electronic device 620, and/or a channel (or a frequency band) preferred by the second electronic device 620). The address of the second electronic device 620 included in the discovery response message is an address used when data is received through the second communication scheme and may include a MAC address and an IP address. The capability information of the second electronic device 620 included in the discovery message is capability information related to the second communication scheme and may include, for example, a frequency band which can be supported by the second electronic device 620, a channel band, and/or the maximum number of sessions which can be generated.

The first electronic device 500 and the second electronic device 620 may establish a first session on the basis of the information on the second electronic device 620 related to the first communication scheme in operation 709.

The first electronic device 500 may receive information on the second electronic device 620 related to the first communication scheme and/or information on the second electronic device 620 related to the second communication scheme and generate the first session on the basis of the information on the second electronic device 620 related to the first communication scheme. The first session is a session generated on the basis of the first communication scheme and may be a session for direct communication between the electronic device 500 and the second electronic device 620.

The first electronic device 500 and the second electronic device 620 may transmit and/or receive data through the first session in operation 711.

The first electronic device 500 may identify that the first electronic device 500 satisfies a predetermined condition in operation 713.

The predetermined condition may include a condition for switching the first communication scheme to the second communication scheme.

According to an embodiment, the predetermined condition may include a condition for ending the first session.

The first electronic device 500 may not simultaneously transmit or receive data through different schemes of the same short-range wireless communication. For example, the first electronic device 500 may not simultaneously transmit or receive data through the second communication scheme in the state in which data is transmitted or received through the first communication scheme. When the first electronic device 500 transmits or receives data to or from another electronic device through the second communication scheme in the state in which data is transmitted or received through the first session, the first electronic device 500 may determine that the first session can be ended and the predetermined condition is satisfied.

When the first electronic device 500 is connected to an AP different from the currently connected AP 610, the first electronic device 500 may end the first session. The first communication scheme may support direct communication between electronic devices connected to the same AP but not support direct communication between electronic devices connected to different APs. When the first electronic device 500 is connected to another AP in the state in which data is transmitted or received through the first session, it may be determined that the first session can be ended and the predetermined condition is satisfied.

When a communication circuit (for example, the communication circuit 510 of FIG. 5) exceeds the maximum number of supported sessions, the first electronic device 500 may end the first session. For example, when the first electronic device 500 including the communication circuit 510 supporting a maximum of one TDLS connection makes a connection with another electronic device through the first communication scheme in the state in which the first electronic device 500 is connected to the second electronic device 620 through the first session, it may be determined that the first session can be ended and the first session satisfies the predetermined condition.

According to an embodiment, the predetermined condition may include a condition indicating that data transmitted or received through the first session has a predetermined data type (for example, video) or has a predetermined size or larger.

The first electronic device 500 may identify a part (for example, metadata or header) of the data transmitted or received through the first session and determine that the predetermined condition is satisfied on the basis of identification that the data type corresponds to a predetermined type.

The first electronic device 500 may identify a part (for example, metadata or header) of the data transmitted or received through the first session and determine that the predetermined condition is satisfied on the basis of identification that the data size is equal to or larger than a predetermined size.

According to an embodiment, the predetermined condition may include a condition indicting that the QoS of the first session is equal to or lower than a predetermined value.

The first electronic device 500 may identify the quality (for example, RSRP) of the signal transmitted through the first session and determine that the predetermined condition is satisfied on the basis of identification that the quality is equal to or lower than a predetermined value.

According to an embodiment, the predetermined condition may include a condition indicating that the quality (QoS) of the channel generated between the first electronic device 500 and the AP 610 is equal to or lower than a predetermined value.

The first electronic device 500 may identify the quality (for example, RSRP) of the signal transmitted by the AP 210 and determine that the predetermined condition is satisfied on the basis of identification that the quality is equal to or lower than a predetermined value The first electronic device 500 may perform a series of operations for switching the first communication scheme to the second communication scheme on the basis of satisfaction of the predetermined condition.

The first electronic device 500 may control the communication circuit 510 to transmit and/or receive data through the second communication scheme on the basis of satisfaction of the predetermined condition. The first electronic device 500 may control the communication circuit 510 to discover the second electronic device 620 through the second communication scheme.

The first electronic device 500 may discover the second electronic device 620 through the second communication scheme in operation 715.

According to an embodiment, the first electronic device 500 may discover the second electronic device 620 on the basis of information on the second electronic device 620 related to the second communication scheme. For example, the first electronic device 500 may discover the second electronic device 620 in a frequency band supported by the second electronic device 620 on the basis of the information on the second electronic device 620 related to the second communication scheme. The first electronic device 500 may acquire in advance the information on the second electronic device 620 related to the second communication scheme during the process of generating the first session, thereby reducing the time spent for discovering the second electronic device 620 through the second communication scheme.

According to an embodiment, the first electronic device 500 may discover at least one external electronic device supporting the second communication scheme. The first electronic device 500 may select the second electronic device 620 to be connected through the second communication scheme on the basis of information on the second electronic device 620 related to the second communication scheme from among the at least one discovered external electronic device. For example, the processor 520 may select the second electronic device 620 having an address which is the same as the address (or identification information) of the external electronic device included in the information on the external electronic device related to the second communication scheme from among the discovered external electronic devices as the second electronic device 620 to be connected through the second communication scheme.

The first electronic device 500 and the second electronic device 620 may establish the second session on the basis of the information on the first electronic device 500 related to the second communication scheme and the information on the second electronic device 620 related to the second communication scheme in operation 717.

According to an embodiment, the first electronic device 500 may set up the second session through a channel having a frequency band (or a preferred channel) which can be supported by the second electronic device 620, included in the information on the external electronic device related to the second communication scheme.

The first electronic device 500 and the second electronic device 620 may transmit and/or receive data through the second session in operation 719.

FIG. 8 illustrates an embodiment in which the electronic device establishes both a first session and a session according to an embodiment of the disclosure.

Referring to FIG. 8, a first electronic device (for example, the first electronic device 500 of FIG. 5) and the AP 610 (for example, the AP 210 of FIG. 2) may be connected through short-range wireless communication in operation 801.

The first electronic device 500 may perform wireless communication with the AP 610 through short-range wireless communication. The short-range wireless communication may be a communication scheme supported by both the first electronic device 500 and/or the AP 610. For example, the wireless communication may be Wi-Fi. The AP 610 may serve as a base station providing wireless communication to at least one electronic device (for example, the first electronic device 500 and the second electronic device 620) located within a communication radius of a WLAN system (for example, the WLAN system 200 of FIG. 2).

The second electronic device 620 (for example, the second electronic device 230 of FIG. 2) and the AP 610 may be connected through short-range wireless communication in operation 803.

The second electronic device 620 may perform wireless communication with the AP 210 through short-range wireless communication.

The first electronic device 500 and/or the second electronic device 620 may perform a series of operations for performing direct communication (for example, D2D) without passing through the AP 610 due to the generation of various situations. According to an embodiment, the first electronic device 500 and/or the second electronic device 620 may perform a series of operations for detecting execution of a specific application requiring direct communication between electronic devices (for example, an application sharing data, an application sharing content, or an application supporting mirroring) or execution of a function supported by a specific application and performing direct communication between devices.

The first electronic device 500 may discover (for example, TDLS discovery) the second electronic device 620 to be connected to the first electronic device 500 through the first communication scheme in operation 805. The second electronic device 620 discovered through the first communication scheme may be in the connected state with the AP 610 connected to the electronic device 500. The first electronic device 500 may broadcast a discovery message (for example, a TDLS discover message) through a channel connected between the first electronic device 500 and the AP 610.

The discovery message may include information on the first electronic device 500 related to the first communication scheme (for example, an address of the first electronic device 500, capability information of the first electronic device 500, a channel (or a frequency band) supported by the first electronic device 500, and/or a channel (or a frequency band) preferred by the first electronic device 500). The address of the first electronic device 500 included in the discovery message is an address used when data is received through the first communication scheme and may include a MAC address or an IP address. The capability information of the first electronic device 500 included in the discovery message is capability information related to the first communication scheme and may include, for example, a frequency band supported by the first electronic device 500, a channel band, and/or the maximum number of sessions which can be generated.

The discovery message may include information on the first electronic device 500 related to the second communication scheme (for example, an address of the first electronic device 500, capability information of the first electronic device 500, a channel (or a frequency band) supported by the first electronic device 500, and/or a channel (or a frequency band) preferred by the first electronic device 500). The address of the first electronic device 500 included in the discovery message is an address used when data is received through the second communication scheme and may include a MAC address or an IP address. The capability information of the first electronic device 500 included in the discovery message is capability information related to the second communication scheme and may include, for example, a frequency band supported by the first electronic device 500, a channel band, and/or the maximum number of sessions which can be generated.

The second electronic device 620 may transmit information on the second electronic device 620 related to the first communication scheme and information on the second electronic device 620 related to the second communication scheme to the first electronic device 500 through the AP 610 in operation 807. The first electronic device 500 may receive information on the second electronic device 620 related to the first communication scheme and information on the second electronic device 620 related to the second communication scheme from the second electronic device 620 through the AP 610.

The second electronic device 620 receiving the discovery message through the AP 210 may identify information on the first electronic device 500 related to the first communication scheme included in the discovery message, generate a discovery response message corresponding to the discovery message, and transmit the discovery response message to the first electronic device 500 through the channel connected between the second electronic device 620 and the AP 210.

The discovery response message may include information on the second electronic device 620 related to the first communication scheme (for example, an address of the second electronic device 620, capability information of the second electronic device 620, a channel (or a frequency band) supported by the second electronic device 620, and/or a channel (or a frequency band) preferred by the second electronic device 620). The address of the second electronic device 620 included in the discovery response message is an address used when data is received through the first communication scheme and may include a MAC address and an IP address. The capability information of the second electronic device 620 included in the discovery message is capability information related to the first communication scheme and may include, for example, a frequency band which can be supported by the second electronic device 620, a channel band, and/or the maximum number of sessions which can be generated.

The discovery response message may include information on the second electronic device 620 related to the second communication scheme (for example, an address of the second electronic device 620, capability information of the second electronic device 620, a channel (or a frequency band) supported by the second electronic device 620, and/or a channel (or a frequency band) preferred by the second electronic device 620). The address of the second electronic device 620 included in the discovery response message is an address used when data is received through the second communication scheme and may include a MAC address and an IP address. The capability information of the second electronic device 620 included in the discovery message is capability information related to the second communication scheme and may include, for example, a frequency band which can be supported by the second electronic device 620, a channel band, and/or the maximum number of sessions which can be generated.

The first electronic device 500 and the second electronic device 620 may establish a first session on the basis of the information on the second electronic device 620 related to the first communication scheme in operation 809.

The first electronic device 500 may receive information on the second electronic device 620 related to the first communication scheme and/or information on the second electronic device 620 related to the first communication scheme and generate the first session on the basis of the information on the second electronic device 620 related to the first communication scheme. The first session is a session generated on the basis of the first communication scheme and may be a session for direct communication between the electronic device 500 and the second electronic device 620.

The first electronic device 500 and the second electronic device 620 may establish the second session on the basis of the information on the first electronic device 500 related to the second communication scheme and the information on the second electronic device 620 related to the second communication scheme in operation 811.

The first electronic device 500 and the second electronic device 620 may simultaneously establish the first session and the second session and may establish the second session earlier than the first sessions. There is no limitation in the order of session establishment.

The first electronic device 500 may transmit metadata to the second electronic device 620 through the first session in operation 813.

Before transmitting data, the first electronic device 500 may transmit metadata corresponding to the data to the second electronic device 620 through the first session according to execution of a specific application (for example, an application sharing data, an application sharing content, or an application supporting mirroring) requiring direct communication between electronic devices or execution of a function supported by the specific application.

The metadata may include information indicating data. The metadata may include information indicating a data type (for example, a document, a video, an image, and/or audio). According to an embodiment, when the data includes an image or a video, the metadata may include a thumbnail image of the image or an image obtained by capturing some of the video. According to an embodiment, the metadata may include information indicating a data size.

The second electronic device 620 may receive the metadata and output the metadata. When the metadata includes an image, the second electronic device 620 may output the metadata on the display of the second electronic device 620. When the metadata includes audio, the second electronic device 620 may output the metadata through a speaker of the second electronic device 620.

FIG. 8 illustrates that transmission of the metadata is performed after the second session is established, but the transmission of the metadata may also be performed before the second session is established.

The second electronic device 620 may transmit a signal making a request for data transmission to the first electronic device 500 in operation 815.

The second electronic device 620 may receive a user input making a request for data transmission through an interface. The second electronic device 620 may transmit a signal making a request for data transmission to the first electronic device 500 on the basis of reception of a user input making a request for data transmission.

The signal making the request for data transmission may be transmitted through the first session or the second session. Alternatively, the signal making the request for data transmission may be transmitted through other wireless communication (for example, Bluetooth or Bluetooth low energy (BLE)).

The first electronic device 500 may transmit data to the second electronic device 620 through the second session in operation 817.

Alternatively, after receiving the metadata, the second electronic device 620 may transmit a signal making a request for cancelling data transmission to the first electronic device 500.

The signal making the request for cancelling data transmission may be transmitted through the first session or the second session. Alternatively, the signal making the request for data transmission may be transmitted through other wireless communication (for example, Bluetooth or Bluetooth low energy (BLE)).

According to reception of the signal making the request for cancelling data transmission, the first electronic device 500 may not transmit data through the second session or may cancel data transmission if data is being already transmitted through the second session. The second electronic device 620 may delete some of the data received through the second session.

FIG. 9 is a flowchart 900 illustrating a method of operating an electronic device according to an embodiment of the disclosure.

Referring to FIG. 9, the first electronic device 500 (for example, the first electronic device 500 of FIG. 5) may receive information on a second electronic device (for example, the second electronic device 620 of FIG. 6) related to the first communication scheme and information on the second electronic device 620 related to the second communication scheme in operation 910.

According to an embodiment, the information on the second electronic device 620 related to the first communication scheme and the information on the second electronic device 620 related to the second communication scheme may be included in a discovery response message.

The discovery response message may include information on the second electronic device 620 related to the first communication scheme (for example, an address of the second electronic device 620, capability information of the second electronic device 620, a channel (or a frequency band) supported by the second electronic device 620, and a channel (or a frequency band) preferred by the second electronic device 620). The address of the second electronic device 620 included in the discovery response message is an address used when data is received through the first communication scheme and may include a MAC address and an IP address. The capability information of the second electronic device 620 included in the discovery message is capability information related to the first communication scheme and may include, for example, a frequency band which can be supported by the second electronic device 620, a channel band, and/or the maximum number of sessions which can be generated.

The discovery response message may include information on the second electronic device 230 related to the second communication scheme (for example, the address of the second electronic device 230, the capability information of the second electronic device 230, a channel (or the frequency band) supported by the second electronic device 230, and/or the channel (or the frequency band) preferred by the external electronic device 620). The address of the second electronic device 620 included in the discovery response message is an address used when data is received through the second communication scheme and may include a MAC address and an IP address. The capability information of the second electronic device 620 included in the discovery message is capability information related to the second communication scheme and may include, for example, a frequency band which can be supported by the second electronic device 620, a channel band, and/or the maximum number of sessions which can be generated.

The information on the second electronic device 620 related to the second communication scheme may be included not only the discovery response message but also various messages transmitted by the second electronic device 620.

The first electronic device 500 may set up the first session with the second electronic device 620 on the basis of the information on the second electronic device 620 related to the first communication scheme in operation 920.

The first electronic device 500 may generate the first session corresponding to the first communication scheme with the second electronic device 620 discovered during the discovery process on the basis of the information on the second electronic device 620 related to the first communication scheme and control the communication circuit 510 to transmit or receive data through the first session.

The first electronic device 500 may discover an external electronic device on the basis of the information on the second electronic device 620 related to the second communication scheme on the basis of the first electronic device 500 satisfying a predetermined condition in operation 930.

The predetermined condition may include a condition for switching the first communication scheme to the second communication scheme.

According to an embodiment, the predetermined condition may include a condition for ending the first session.

The first electronic device 500 may not simultaneously transmit or receive data through different schemes of the same short-range wireless communication. For example, the first electronic device 500 may not simultaneously transmit or receive data through the second communication scheme in the state in which data is transmitted or received through the first communication scheme. When the first electronic device 500 transmits or receives data to or from another electronic device through the second communication scheme in the state in which data is transmitted or received through the first session, the first electronic device 500 may determine that the first session can be ended and the predetermined condition is satisfied.

When the first electronic device 500 is connected to an AP different from the currently connected AP 210, the first electronic device 500 may end the first session. The first communication scheme may support direct communication between electronic devices connected to the same AP but not support direct communication between electronic devices connected to different APs. When the first electronic device 500 is connected to another AP in the state in which data is transmitted or received through the first session, it may be determined that the first session can be ended and the predetermined condition is satisfied.

The first electronic device 500 may end the first session in the state in which the communication circuit 510 exceeds the maximum number of supported sessions. For example, when the first electronic device 500 including the communication circuit 510 supporting a maximum of one TDLS connection makes a connection with another electronic device through the first communication scheme in the state in which the first electronic device 500 is connected to the second electronic device 620 through the first session, it may be determined that the first session can be ended and the first session satisfies the predetermined condition.

According to an embodiment, the predetermined condition may include a condition indicating that data transmitted or received through the first session has a predetermined data type (for example, video) or has a predetermined size or larger.

The first electronic device 500 may identify a part (for example, metadata or header) of the data transmitted or received through the first session and determine that the predetermined condition is satisfied on the basis of identification that the data type corresponds to a predetermined type.

The first electronic device 500 may identify a part (for example, metadata or header) of the data transmitted or received through the first session and determine that the predetermined condition is satisfied on the basis of identification that the data size is equal to or larger than a predetermined size.

According to an embodiment, the predetermined condition may include a condition indicting that the QoS of the first session is equal to or lower than a predetermined value.

The first electronic device 500 may identify the quality (for example, RSRP) of the signal transmitted through the first session and determine that the predetermined condition is satisfied on the basis of identification that the quality is equal to or lower than a predetermined value.

According to an embodiment, the predetermined condition may include a condition indicating that the quality (QoS) of the channel generated between the first electronic device 500 and the AP 210 is equal to or lower than a predetermined value.

The first electronic device 500 may identify the quality (for example, RSRP) of the signal transmitted by the AP 210 and determine that the predetermined condition is satisfied on the basis of identification that the quality is equal to or lower than a predetermined value.

The first electronic device 500 may perform a series of operations for switching the first communication scheme to the second communication scheme on the basis of satisfaction of the predetermined condition.

The first electronic device 500 may set up the second session with the second electronic device 620 on the basis of the information on the second electronic device 620 related to the second communication scheme in operation 940.

According to an embodiment, the first electronic device 500 may discover the second electronic device 620 on the basis of information on the second electronic device 620 related to the second communication scheme. For example, the first electronic device 500 may discover the second electronic device 620 in a frequency band supported by the second electronic device 620 on the basis of the information on the second electronic device 620 related to the second communication scheme. The first electronic device 500 may acquire in advance information on the external electronic device 620 related to the second communication scheme during the process of generating the first session, thereby reducing the time spent for discovering the external electronic device 620 through the second communication scheme.

According to an embodiment, the first electronic device 500 may discover at least one external electronic device supporting the second communication scheme. The first electronic device 500 may select the external electronic device 620 to be connected through the second communication scheme on the basis of the information on the external electronic device related to the second communication scheme from among at least one discovered external electronic device. For example, the first electronic device 500 may select an external electronic device having an address which is the same as the address (or identification information) of the external electronic device included in the information on the external electronic device related to the second communication scheme from among the discovered external electronic devices as the external electronic device 620 to be connected through the second communication scheme.

The first electronic device 500 may transmit or receive data to or from the external electronic device 620 through the second session in operation 950.

An electronic device (for example, the first electronic device 500 of FIG. according to various embodiments of the disclosure may include a communication circuit (for example, the communication circuit 510 of FIG. 5), and a processor 520 (for example, the processor 520 of FIG. 5) operatively connected to the communication circuit 510, and the processor 520 may be configured to receive, in a connected state with an access point (AP) (for example, the AP 210 of FIG. 2), information on an external electronic device 620 related to a first communication scheme for data transmission and/or reception between the external electronic device (for example, the second electronic device 620 of FIG. 6) connected to the AP 210 and the electronic device and information on the external electronic device 620 related to a second communication scheme different from the first communication scheme, set up a first session supported by the first communication scheme with the external electronic device 620, based on the information on the external electronic device 620 related to the first communication scheme, discover the external electronic device 620, based on the information on the external electronic device 620 related to the second communication scheme according to the electronic device satisfying a predetermined condition while data transmission and/or reception through the first session are performed, set up a second session, based on data related to the second communication scheme, and perform data transmission and/or reception through the second session.

In the electronic device 500 according to various embodiments of the disclosure, the predetermined condition may include a condition indicating that the first session ends.

In the electronic device 500 according to various embodiments of the disclosure, the predetermined condition may include a condition indicating that the electronic device transmits and/or receives data through different communication schemes supported by the communication circuit 510.

In the electronic device 500 according to various embodiments of the disclosure, the first communication scheme and the second communication scheme may be communication schemes (device to device (D2D)) for directly connecting the electronic device with the external electronic device 620.

In the electronic device 500 according to various embodiments of the disclosure, the predetermined condition may include a condition indicating that a size of data transmitted or received through the first session is larger than or equal to a predetermined size.

In the electronic device 500 according to various embodiments of the disclosure, the first communication scheme may include a communication scheme for setting up a communication channel, based on data transmitted or received through the AP 210, and the second communication scheme may include a communication scheme for setting up a communication channel, based on data exchanged between the electronic device and the external electronic device 620.

In the electronic device 500 according to various embodiments of the disclosure, the processor 520 may be configured to receive the information on the external electronic device 620 related to the first communication scheme and the information on the external electronic device 620 related to the second communication scheme through a communication channel generated between the AP 210 and the electronic device.

In the electronic device 500 according to various embodiments of the disclosure, the processor 520 may be configured to transmit or receive data to or from the external electronic device 620 through the AP 210, based on the second session which has not been set up.

In the electronic device 500 according to various embodiments of the disclosure, the processor 520 may be configured to, in case that a number of external electronic devices 620 discovered through the second communication scheme is plural, select the external electronic device 620 from among the plurality of external electronic devices 620, based on the information on the external electronic device 620 related to the second communication scheme and set up the second session with the selected external electronic device 620.

In the electronic device 500 according to various embodiments of the disclosure, the information on the external electronic device 620 related to the first communication scheme may include an Internet protocol (IP) address used for transmitting and/or receiving data through the first communication scheme, and the information on the external electronic device 620 related to the second communication scheme may include an IP address used for transmitting and/or receiving data through the second communication scheme.

A method of operating an electronic device according to various embodiments of the disclosure may include an operation of, in a state in which the electronic device (for example, the first electronic device 500 of FIG. 5) is connected to an access point (AP) (for example, the AP 210 of FIG. 2), receiving information on an external electronic device 620 related to a first communication scheme for data transmission and/or reception between the external electronic device (for example, the second electronic device 620 of FIG. 6) connected to the AP 210 and the electronic device and information on the external electronic device 620 related to a second communication scheme different from the first communication scheme; an operation of setting up a first session supported by the first communication scheme with the external electronic device 620, based on the information on the external electronic device 620 related to the first communication scheme; an operation of discovering the external electronic device 620, based on the information on the external electronic device 620 related to the second communication scheme according to the first session satisfying a predetermined condition while data transmission and/or reception through the first session are performed; an operation of setting up a second session, based on information related to the second communication scheme, and an operation of performing data transmission and/or reception through the second session.

In the method of operating the electronic device according to various embodiments of the disclosure, the predetermined condition may include a condition indicating that the first session ends.

In the method of operating the electronic device according to various embodiments of the disclosure, the predetermined condition may include a condition indicating that the electronic device transmits and/or receives data through different communication schemes supported by the communication circuit 510.

In the method of operating the electronic device according to various embodiments of the disclosure, the first communication scheme and the second communication scheme may be communication schemes (device to device (D2D)) for directly connecting the electronic device with the external electronic device 620.

In the method of operating the electronic device according to various embodiments of the disclosure, the predetermined condition may include a condition indicating that a size of data transmitted or received through the first session is larger than or equal to a predetermined size.

In the method of operating the electronic device according to various embodiments of the disclosure, the first communication scheme may include a communication scheme for setting up a communication channel, based on data transmitted or received through the AP 210, and the second communication scheme may include a communication scheme for setting up a communication channel, based on data exchanged between the electronic device and the external electronic device 620.

In the method of operating the electronic device according to various embodiments of the disclosure, the operation of receiving the information on the external electronic device 620 may include an operation of receiving the information on the external electronic device 620 related to the first communication scheme and the information on the external electronic device 620 related to the second communication scheme through a communication channel generated between the AP 210 and the electronic device.

The method of operating the electronic device according to various embodiments of the disclosure may further include an operation of transmitting or receiving data to or from the external electronic device through the AP, based on the second session which has not been set up.

The method of operating the electronic device according to various embodiments of the disclosure may further include an operation of, in case that a number of external electronic devices 620 discovered through the second communication scheme is plural, selecting the external electronic device 620 from among the plurality of external electronic devices 620, based on the information on the external electronic device 620 related to the second communication scheme and an operation of setting up the second session with the selected external electronic device 620.

In the method of operating the electronic device according to various embodiments of the disclosure, the information on the external electronic device 620 related to the first communication scheme may include an Internet protocol (IP) address used for transmitting and/or receiving data through the first communication scheme, and the information on the external electronic device 620 related to the second communication scheme may include an IP address used for transmitting and/or receiving data through the second communication scheme.

An electronic device (for example, the first electronic device 500 of FIG. according to various embodiments of the disclosure may include a communication circuit (for example, the communication circuit 510 of FIG. 5) and a processor (for example, the processor 520 of FIG. 5) operatively connected to the communication circuit 510, and the processor 520 may be configured to receive, in a connected state with an access point (AP) (for example, the AP 210 of FIG. 2), information on an external electronic device 620 related to a first communication scheme for data transmission and/or reception between the external electronic device 620 and the electronic device and information on the external electronic device 620 related to a second communication scheme different from the first communication scheme, based on required transmission of data to the external electronic device 620 connected to the AP 210; set up a first session supported by the first communication scheme and a second session supported by the second communication scheme with the external electronic device 620, based on the information on the external electronic device 620 related to the first communication scheme and the information on the external electronic device 620 related to the second communication scheme; transmit metadata corresponding to the data to the external electronic device 620 through the first session; and transmit the data through the second session, based on reception of a signal making a request for transmitting the data from the external electronic device 620.

In the electronic device 500 according to various embodiments of the disclosure, the processor 520 may be configured to stop the data transmission through the second session, based on reception of a signal making a request for cancelling the data transmission from the external electronic device 620.

In the electronic device 500 according to various embodiments of the disclosure, the information on the external electronic device 620 related to the first communication scheme may include an Internet protocol (IP) address used for transmitting and/or receiving data through the first communication scheme, and the information on the external electronic device 620 related to the second communication scheme may include an IP address used for transmitting and/or receiving data through the second communication scheme.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
communication circuitry;
memory, comprising one or more storage media, storing instructions; and
one or more processors communicatively coupled to the communication circuitry and the memory-circuit,
wherein the instructions, when executed by the one or more processors individually or collectively, cause the electronic device to:
in a connected state with an access point (AP), receive first information of an external electronic device related to a tunneled direct link setup (TDLS) scheme for data transmission and/or reception between the external electronic device connected to the AP and the electronic device and second information of the external electronic device related to a Wi-Fi direct scheme different from the TDLS scheme,
establish a first session supported by the TDLS scheme with the external electronic device based on the first information of the external electronic device related to the TDLS scheme,
based on identifying that a predetermined condition is satisfied while the data transmission and/or reception is performed in the first session supported by the TDLS scheme, discover the external electronic device based on the second information of the external electronic device related to the Wi-Fi direct scheme,
in response to discovering the external electronic device, establish a second session based on data related to the Wi-Fi direct scheme, and
perform data transmission and/or reception through the second session.

2. The electronic device of claim 1, wherein the predetermined condition comprises a condition indicating that the first session ends.

3. The electronic device of claim 1, wherein the predetermined condition comprises a condition indicating that the electronic device transmits and/or receives data through different communication schemes supported by the communication circuitry.

4. The electronic device of claim 1, wherein the TDLS scheme and the Wi-Fi direct scheme are device to device (D2D) communication schemes for directly connecting the electronic device with the external electronic device.

5. The electronic device of claim 1, wherein the predetermined condition comprises a condition indicating that a size of data transmitted or received through the first session is larger than or equal to a predetermined size.

6. The electronic device of claim 1,
wherein the TDLS scheme comprises a communication scheme for setting up a first communication channel based on data transmitted or received through the AP, and
wherein the Wi-Fi direct scheme comprises a communication scheme for setting up a second communication channel based on data exchanged between the electronic device and the external electronic device.

7. The electronic device of claim 1, wherein the instructions, when executed by the one or more processors individually or collectively, further cause the electronic device to:
receive the first information of the external electronic device related to the TDLS scheme and the second information of the external electronic device related to the Wi-Fi direct scheme through a communication channel generated between the AP and the electronic device.

8. The electronic device of claim 1, wherein the instructions, when executed by the one or more processors individually or collectively, is-further configured cause the electronic device to:
transmit or receive data to or from the external electronic device through the AP based on failing to establish the second session.

9. The electronic device of claim 1, wherein the instructions, when executed by the one or more processors individually or collectively, further cause the electronic device to:
in case that a plurality of external electronic devices are discovered through the Wi-Fi direct scheme, select the external electronic device from among the plurality of external electronic devices based on the second information of the external electronic device related to the second communication Wi-Fi direct scheme; and
establish the second session with the selected external electronic device.

10. The electronic device of claim 1,
wherein the first information of the external electronic device related to the TDLS scheme comprises an Internet protocol (IP) address used for transmitting and/or receiving data through the TDLS scheme, and wherein the second information of the external electronic device related to the Wi-Fi direct scheme comprises an IP address used for transmitting and/or receiving data through the Wi-Fi direct scheme.

11. A method performed by an electronic device, the method comprising:

in a state in which the electronic device is connected to an access point (AP), receiving, by the electronic device, first information of an external electronic device related to a tunneled direct link setup (TDLS) scheme for data transmission and/or reception between the external electronic device connected to the AP and the electronic device and second information of the external electronic device related to a Wi-Fi direct scheme different from the TDLS scheme;

establishing, by the electronic device, a first session supported by the TDLS scheme with the external electronic device based on the first information of the external electronic device related to the TDLS scheme;

based on identifying that a predetermined condition is satisfied while the data transmission and/or reception is performed in the first session supported by the TDLS scheme, discovering, by the electronic device, the external electronic device based on the second information of the external electronic device related to the Wi-Fi direct scheme;

in response to discovering the external electronic device, establishing, by the electronic device, a second session based on the second information related to the Wi-Fi direct scheme; and performing, by the electronic device, data transmission and/or reception through the second session.

12. The method of claim 11, wherein the predetermined condition comprises a condition indicating that the first session ends.

13. The method of claim 11, wherein the predetermined condition comprises a condition indicating that the electronic device transmits and/or receives data through different communication schemes supported by the electronic device.

14. The method of claim 11, wherein the TDLS scheme and the Wi-Fi direct scheme are device to device (D2D) communication schemes for directly connecting the electronic device with the external electronic device.

15. The method of claim 11, wherein the predetermined condition comprises a condition indicating that a size of data transmitted or received through the first session is larger than or equal to a predetermined size.

16. The method of claim 11, wherein the TDLS scheme comprises a communication scheme for setting up a communication channel based on data transmitted or received through the AP, and wherein the Wi-Fi direct scheme comprises a communication scheme for setting up a communication channel based on data exchanged between the electronic device and the external electronic device.

17. The method of claim 11, wherein the receiving of the first information and the second information of the external electronic device comprises receiving the first information of the external electronic device related to the TDLS scheme and the second information of the external electronic device related to the Wi-Fi direct scheme through a communication channel generated between the AP and the electronic device.

18. The method of claim 11, further comprising:

transmitting or receiving, by the electronic device, data to or from the external electronic device through the AP based on the second session.

19. The method of claim 11, further comprising:

based on a plurality of external electronic devices being discovered through the Wi-Fi direct scheme, selecting the external electronic device from among the plurality of external electronic devices based on the second information of the external electronic device related to the Wi-Fi direct scheme; and establishing, by the electronic device, the second session with the selected external electronic device.

20. An electronic device comprising:

a communication circuitry;

memory, comprising one or more storage media, storing instructions; and one or more processors communicatively coupled to the communication circuitry and the memory, wherein the instructions, when executed by the one or more processors individually or collectively, is cause the electronic device to:

in a connected state with an access point (AP), receive first information of an external electronic device related to a tunneled direct link setup (TDLS) scheme for data transmission and/or reception between the external electronic device and the electronic device and second information of the external electronic device related to a Wi-Fi direct scheme different from the TDLS scheme based on required transmission of data to the external electronic device connected to the AP;

establish a first session supported by the TDLS scheme and a second session supported by the Wi-Fi direct scheme with the external electronic device based on the first information of the external electronic device related to the TDLS scheme and the second information of the external electronic device related to the Wi-Fi direct scheme;

transmit, to the external electronic device through the first session, metadata corresponding to the data; and based on receiving, from the external electronic device, a signal making a request for transmitting the data, transmit the data through the second session.

* * * * *